United States Patent
Shimura et al.

(10) Patent No.: US 9,229,384 B2
(45) Date of Patent: Jan. 5, 2016

(54) IMAGE FORMING APPARATUS AND SAFETY CIRCUIT MOUNTED ON THE SAME APPARATUS

(71) Applicant: CANON KABUSHIKI KAISHA, Tokyo (JP)

(72) Inventors: Yasuhiro Shimura, Yokohama (JP); Tatsuya Hotogi, Susono (JP); Yuki Nakajima, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/637,969

(22) Filed: Mar. 4, 2015

(65) Prior Publication Data
US 2015/0253705 A1 Sep. 10, 2015

(30) Foreign Application Priority Data

Mar. 10, 2014 (JP) .................................. 2014-046512
Feb. 12, 2015 (JP) .................................. 2015-025599

(51) Int. Cl.
G03G 15/20 (2006.01)
H02H 9/02 (2006.01)

(52) U.S. Cl.
CPC ............. *G03G 15/2039* (2013.01); *H02H 9/02* (2013.01)

(58) Field of Classification Search
CPC .......... G03G 15/2039; G03G 15/2078; G03G 2215/2035; G03G 15/2042; G03G 15/2046; G03G 15/205; G03G 15/2053; G03G 15/5004
See application file for complete search history.

(56) References Cited

U.S. PATENT DOCUMENTS

| | | | |
|---|---|---|---|
| 7,139,500 B2 | 11/2006 | Kawazu et al. | |
| 7,187,882 B2 | 3/2007 | Kawazu et al. | |
| 7,630,662 B2 | 12/2009 | Namiki et al. | |
| 8,494,383 B2 | 7/2013 | Shimura et al. | |
| 8,606,136 B2 | 12/2013 | Shimura et al. | |
| 8,642,927 B2 | 2/2014 | Shimura | |
| 8,653,422 B2 | 2/2014 | Shimura et al. | |
| 8,698,046 B2 | 4/2014 | Shimura et al. | |
| 8,818,214 B2 | 8/2014 | Shimura | |
| 8,859,940 B2 | 10/2014 | Shimura et al. | |
| 8,884,192 B2 | 11/2014 | Shimura | |
| 8,977,155 B2 | 3/2015 | Shimura | |
| 2010/0054766 A1* | 3/2010 | Kim et al. ........................ | 399/33 |

(Continued)

FOREIGN PATENT DOCUMENTS

| | | |
|---|---|---|
| JP | 2005-208252 A | 8/2005 |
| JP | 2007-212503 A | 8/2007 |

(Continued)

*Primary Examiner* — Roy Y Yi
(74) *Attorney, Agent, or Firm* — Fitzpatrick, Cella, Harper & Scinto

(57) ABSTRACT

An image forming apparatus includes a fixing unit having a heater and fixing a toner image formed on a recording material onto this recording material. The heater includes a first heat-generating member and a second heat-generating member, a first driving element provided on a power supply path to the first heat-generating member; a second driving element provided on a power supply path to the second heat-generating member, a control unit controlling the first driving element and the second driving element respectively, first detection unit for detecting current flowing through the first heat-generating member, a second detection unit of detecting current flowing through the second heat-generating member, and a safety circuit receiving a first output of the first detection unit and a second output of the second detection unit.

42 Claims, 20 Drawing Sheets

(56) References Cited

U.S. PATENT DOCUMENTS

| | | |
|---|---|---|
| 2010/0310267 A1 | 12/2010 | Shimura et al. |
| 2012/0201582 A1 | 8/2012 | Shimura et al. |
| 2013/0266334 A1 | 10/2013 | Shimura et al. |
| 2014/0169811 A1 | 6/2014 | Shimura |
| 2014/0169846 A1 | 6/2014 | Shimura et al. |
| 2014/0193182 A1 | 7/2014 | Shimura et al. |
| 2014/0308051 A1 | 10/2014 | Shimura |
| 2015/0139704 A1 | 5/2015 | Furukawa |
| 2015/0139706 A1 | 5/2015 | Fujiwara et al. |

FOREIGN PATENT DOCUMENTS

| | | |
|---|---|---|
| JP | 4208772 B2 | 1/2009 |
| JP | 2011-18027 A | 1/2011 |

\* cited by examiner

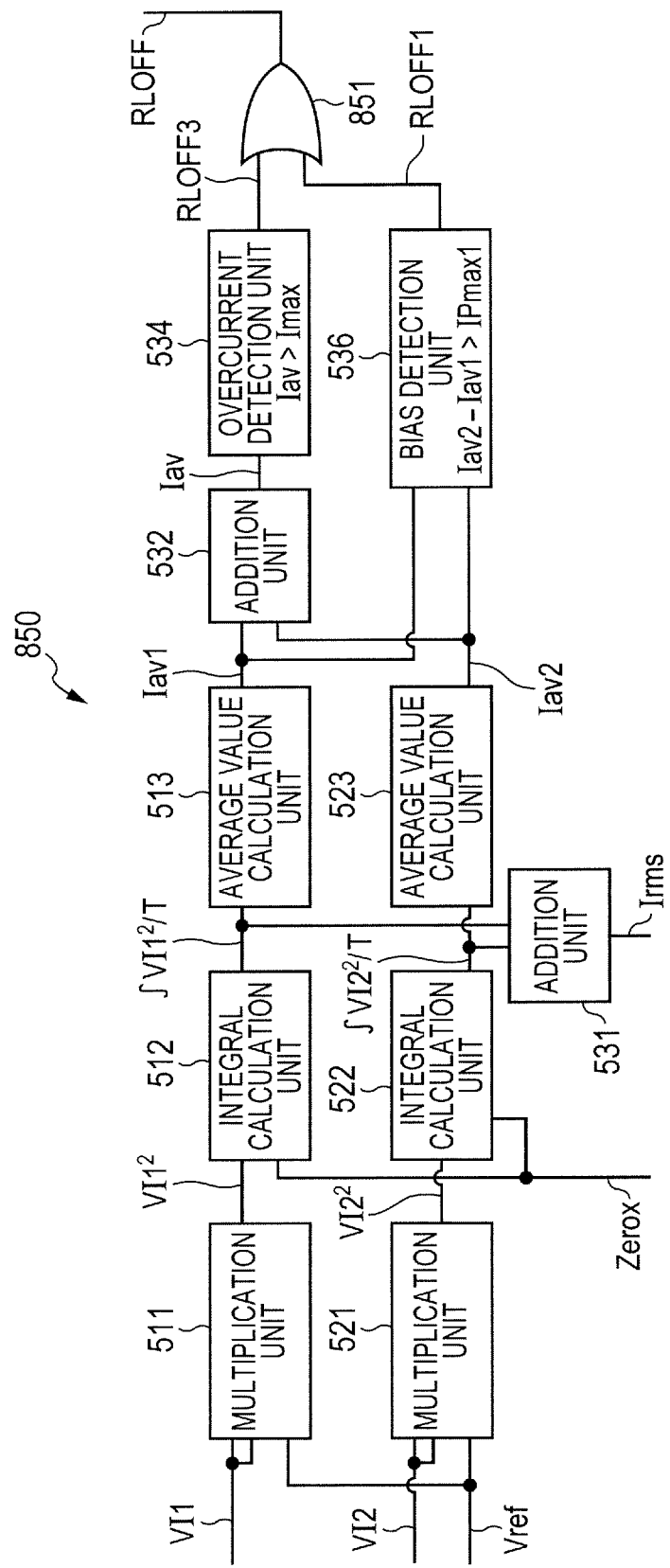

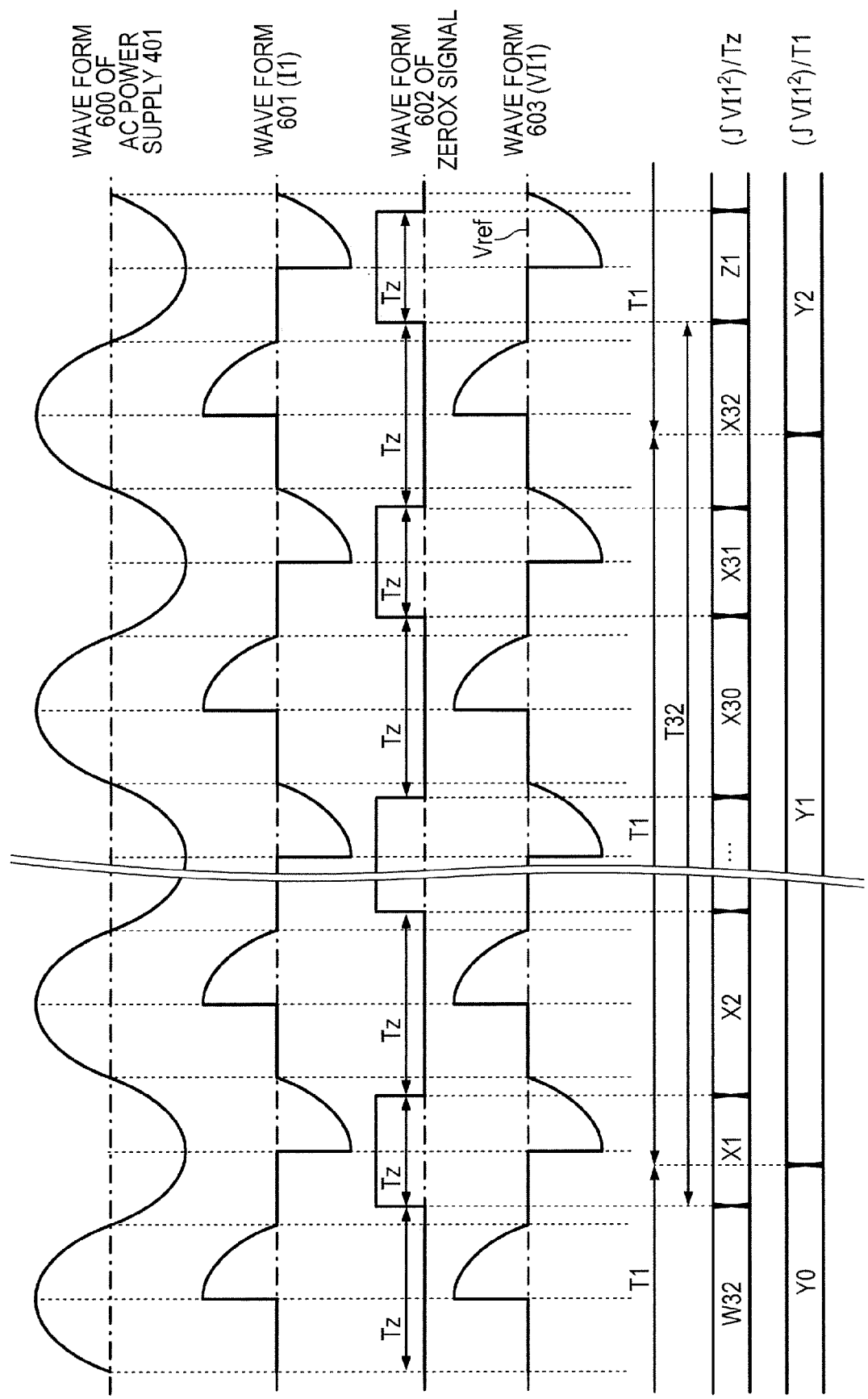

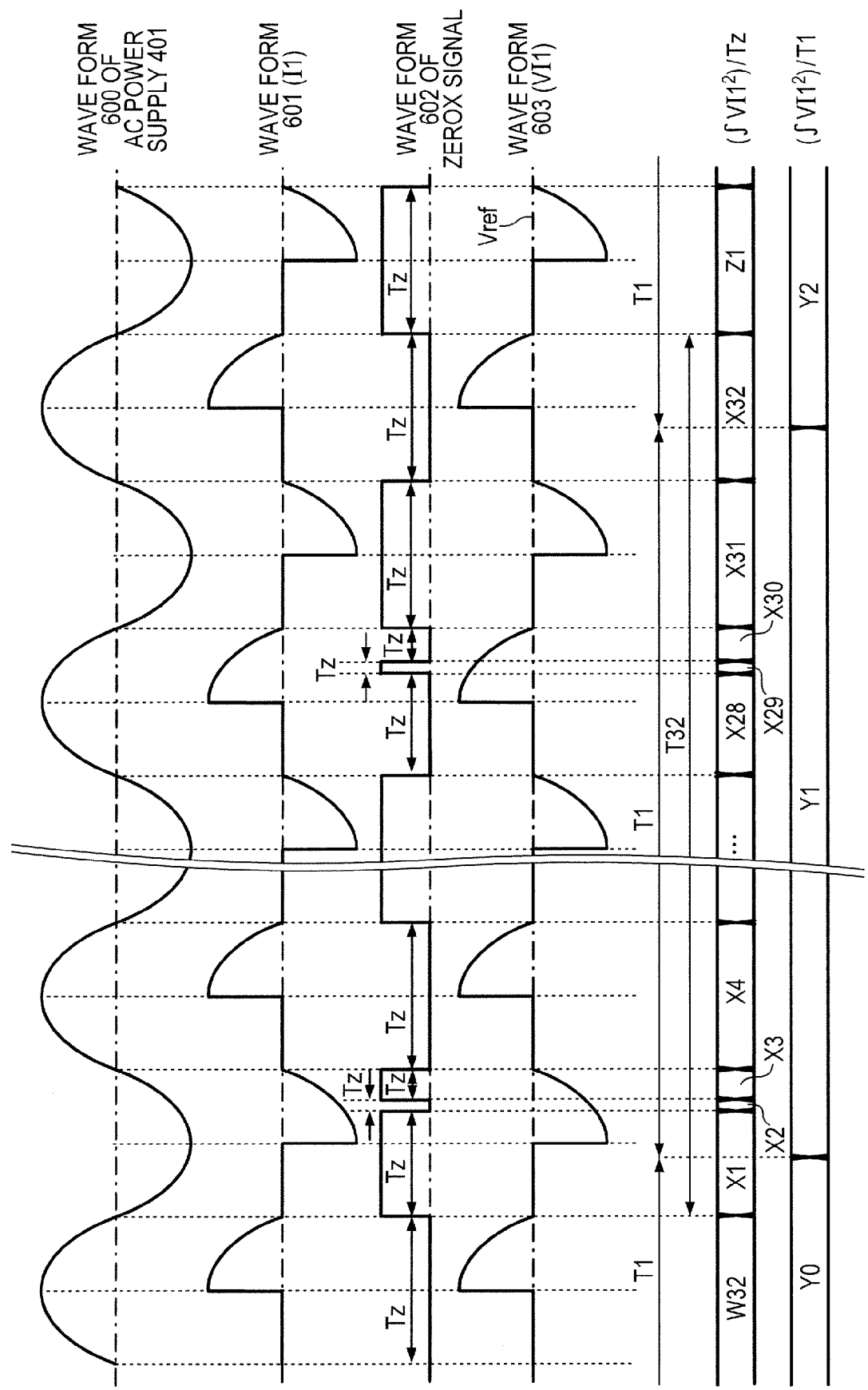

IMAGE FORMING APPARATUS AND SAFETY CIRCUIT MOUNTED ON THE SAME APPARATUS

BACKGROUND OF THE INVENTION

1. Field of the Invention

The present invention relates to an image forming apparatus, such as an electrophotographic printer, and a safety circuit mounted on the same apparatus.

2. Description of the Related Art

Image forming apparatuses using an electrophotographic recording technique, such as a copier and a printer, are equipped with a fixing apparatus as a fixing unit that heats an unfixed toner image formed on a recording material to fix the image on the recording material. A configuration of a fixing apparatus has been known that includes a heater member (ceramic heater) including a substrate and a heat-generating member (heat-generating resistor) formed on the substrate, and performs heating by causing the heat-generating member to generate heat using power supplied from a commercial power supply. The image forming apparatus is equipped with a safety circuit. In case where a failure brings the heater member into a thermal runaway state, the safety circuit detects overcurrent supplied to the heater member, and stops supplying power to the heater member (Japanese Patent Application Laid-Open No. 2007-212503).

In case where failure brings a fixing apparatus including multiple heat-generating members into a thermal runaway state of supplying power only to one or some of the multiple heat-generating members, stress generated in the heater member (substrate) by the heat of the heat-generating member sometimes becomes higher than the stress during a normal operation. It can be considered that the increase in stress generated in a heater member may break the heater member before the safety element, such as a thermal SW, detects an excessive temperature rise state. To address this problem, measures have been required that adopt a highly responsive temperature detecting element, and adopt a substrate material having a high thermal conductivity to reduce the stress generated in the heater member.

SUMMARY OF THE INVENTION

An object of the present invention is to provide a technique capable of increasing the reliability of an image forming apparatus that includes a fixing unit including multiple heat-generating members.

Another object of the present invention is to provide an image forming apparatus that includes a fixing unit fixing a toner image formed on a recording material onto the recording material. The fixing unit includes: a heater including a substrate, and a first heat-generating member and a second heat-generating member that are provided on the substrate, and heating the toner image; a first driving element provided on a power supply path to the first heat-generating member; a second driving element provided on a power supply path to the second heat-generating member; a control unit controlling the first driving element and the second driving element respectively; a first detection unit for detecting current flowing through the first heat-generating member; a second detection unit of detecting current flowing through the second heat-generating member; and a safety circuit receiving a first output of the first detection unit and a second output of second detection unit. The safety circuit outputs a cut-off signal for stopping supplying power to at least one of the first heat-generating member and the second heat-generating member when the difference between a value according to the first output and a value according to the second output exceeds a predetermined threshold.

Another object of the present invention is to provide a safety circuit that includes: a first input unit receiving a first output of a first detection unit for detecting current flowing through the first heat-generating member; a second input unit receiving a second output of a second detection unit for detecting current flowing through the second heat-generating member; and an output unit outputting a cut-off signal for stopping supplying power to at least one of the first heat-generating member and the second heat-generating member when the difference between a value according to the first output and a value according to the second output exceeds a predetermined threshold.

Yet another object of the present invention is to provide an image forming apparatus that includes: a fixing unit fixing a toner image formed on a recording material onto the recording material. The fixing unit includes: a heater including a substrate, and a first heat-generating member and a second heat-generating member that are provided on the substrate, and heating the toner image; a first driving element provided on a power supply path to the first heat-generating member; a second driving element provided on a power supply path to the second heat-generating member; a control unit controlling the first driving element and the second driving element, respectively; a first detection unit for detecting current flowing through the first heat-generating member; a second detection unit of detecting current flowing through the second heat-generating member; and a safety circuit receiving a first output of the first detection unit and a second output of the second detection unit, the safety circuit outputting a cut-off signal for stopping supplying power to at least one of the first heat-generating member and the second heat generating member when a value acquired by dividing the value according to the second output by the value according to the first output exceeds a predetermined threshold.

Still another object of the present invention is to provide a safety circuit that includes: a first input unit receiving a first output of a first detection unit for detecting current flowing through the first heat-generating member; a second input unit receiving a second output of a second detection unit for detecting current flowing through the second heat-generating member; and an output unit outputting a cut-off signal for stopping supplying power to at least one of the first heat generating member and the second heat-generating member when a value acquired by dividing the value according to the second output by the value according to the first output exceeds a predetermined threshold.

Further features of the present invention will become apparent from the following description of exemplary embodiments with reference to the attached drawings.

BRIEF DESCRIPTION OF THE DRAWINGS

FIG. 6C is a diagram illustrating a configuration of a safety circuit.

FIGS. 11A and 11B are diagrams illustrating wave forma for describing internal processes of the safety circuit of Embodiment 4.

DESCRIPTION OF THE EMBODIMENTS

Figure 1A:
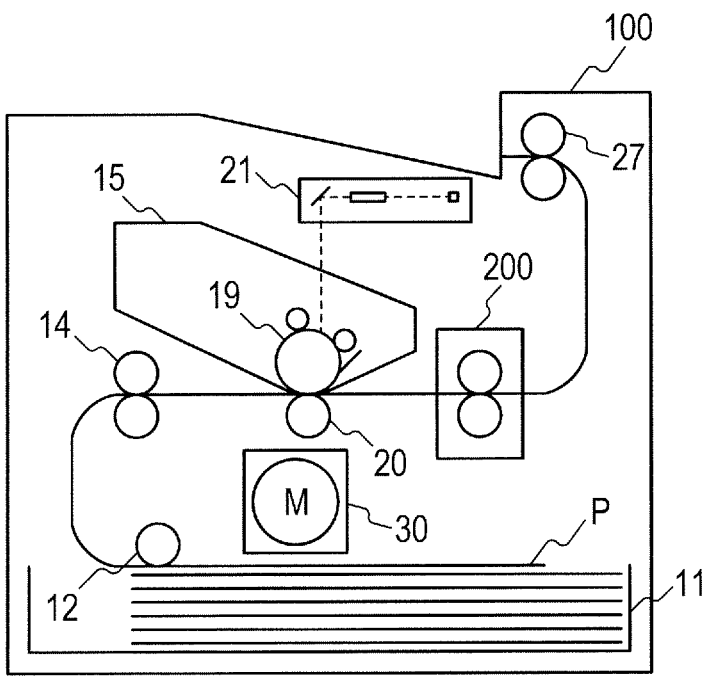
FIG. 1A is an image forming apparatus according to an embodiment of the present invention.

Hereinafter, referring to the drawings, embodiments for implementing the present invention are described in an exemplary manner based exemplary embodiments in detail. Note that the dimensions, materials, shapes and relative arrangement thereof, which are described in the embodiments, are required to be modified according no the configuration of an apparatus to which the present invention is applied and various conditions. That is, the scope of the present invention is not limited to the following embodiments in any sense.

Embodiment 1

Referring to FIGS. 1A and 1B to 5, an image forming apparatus according to Embodiment 1 of the present invention is described.

[Image Forming Apparatus]

FIG. 1A is a sectional view diagrammatically illustrating a schematic configuration of an image forming apparatus 100 according to this embodiment. As an example of an image forming apparatus, a laser beam printer using an electrophotographic recording technique is exemplified and described. When a print signal is issued, a scanner unit 21 emits laser light modulated according to image information. A photoreceptor 19 charged to a predetermined polarity by a charging roller is scanned with the laser light. An electrostatic latent image is thus formed on the photoreceptor 19. The electrostatic latent image is provided with toner from a developing unit, thereby forming a toner image according to the image information on the photoreceptor 19. Meanwhile, sheets (recording material) P stacked on a sheet feeding cassette 11 are fed on a sheet-by-sheet basis by a pickup roller 12 and conveyed to a resist roller 14. The sheet P is further conveyed from the resist roller 14 to a transfer position formed by the photoreceptor 19 and the transfer roller in synchronization with a timing when the toner image on the photoreceptor 19 reaches the transfer position. During a process where the sheet P passes through the transfer position, the toner image on the photoreceptor 19 is transferred to the sheet P. Subsequently, the sheet P is pressurized and heated by a fixing apparatus (fixing unit) 200 and the unfixed toner image is fixed on the sheet P. The sheet P bearing a fixed toner image is elected by a roller 27 to a tray at an upper part of the image forming apparatus 100. A motor 30 is for driving the fixing apparatus 200. A process cartridge 15, which integrally includes the photoreceptor 19, the charging roller and the developing unit as mentioned above, the scanner unit 21, and the transfer roller 20 configures an image forming unit forming an unfixed image on the sheet P.

[Fixing Apparatus]

Figure 1B:
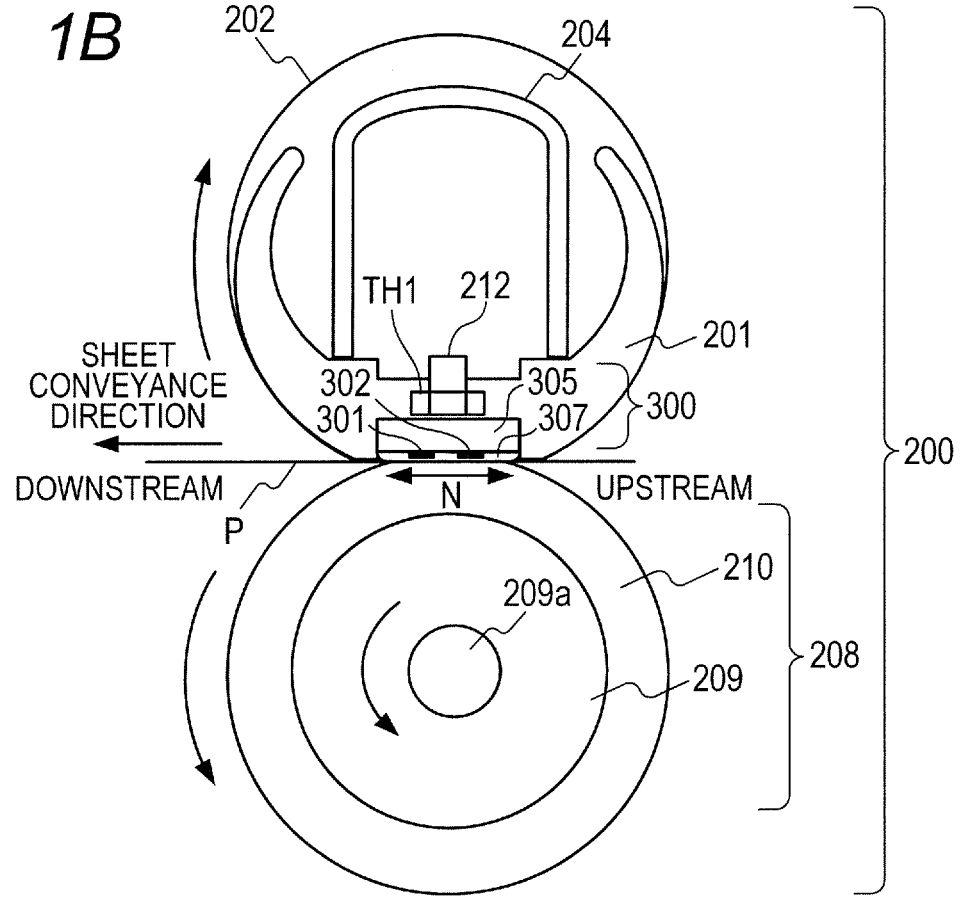
FIG. 1B is a sectional view of a schematic configuration of a fixing apparatus according to the embodiment of the present invention.

FIG. 1B is a sectional view diagrammatically illustrating a schematic configuration of a fixing apparatus (image heating apparatus) 200. The fixing apparatus 200 includes a cylindrical (endless) film 202, a heater (heater member) 300 that is in contact with the inner surface of the film 202, and a pressure roller (nip forming mechanism) 208 that is pressed against the heater 300 via the film 202 to form a fixing nip N. The material of a base layer of the film 202 is heat resistant resin, such as polyimide, or metal, such as stainless steel. The pressure roller 208 includes a metal core 209 made of iron, aluminum or the like, and an elastic layer 210 made of material, such as silicone rubber. The metal core 209 is provided with a rotation shaft 209a integrally formed as the same member as that of this metal core, which meshes with a gear, not illustrated. A driving force of the motor 30 is transmitted to the rotation shaft 209a via the gear, thereby rotating the pressure roller 208. The heater 300 is held by a holding member 201 made of heat resistant resin. The holding member 201 has a guide function of guiding the rotation of the film 202. The pressure roller 208 receives a driving force from the motor 30 to be rotated in an arrow direction. The rotation of the pressure roller 208, in turn, drives the film 202 to rotate.

The heater 300 is planar member (ceramic heater) that includes a ceramic substrate 305, and heat generating members (heat-generating resistors) 301 and 302 formed on the substrate. The first heat-generating member 301 and the second heat-generating member 302 are each formed to have an elongated shape extending along the longitudinal direction of the substrate 305, and are arranged at positions different from each other short transverse direction (the direction orthogonal to the longitudinal direction) of the substrate 305. More specifically, these positions are two positions at one end and the other end of the substrate 305 in the short transverse direction with respect to the center. The heater 300 further includes an insulative (glass in this embodiment) surface protection layer 307 that covers the heat-generating members 301 and 302. A thermistor TH1, which serves as a temperature detecting element (temperature detection unit), is in contact with a sheet passing region of the image forming apparatus 100 on the rear side of the substrate 305. The sheet P bearing an unfixed toner image is sandwiched and conveyed by the fixing nip N, and pressurized and heated to be subjected to a fixing process. A thermal switch that operates and breaks a power supply line to a heat generating region in the case of an abnormal temperature rise at the heater 300, and a safety element 212, such as temperature fuse, are also in contact with the rear surface of the substrate 305. A metal stay 204 is for applying a pressure due to a spring, not illustrated, to the holding member 201.

Figure 2A:
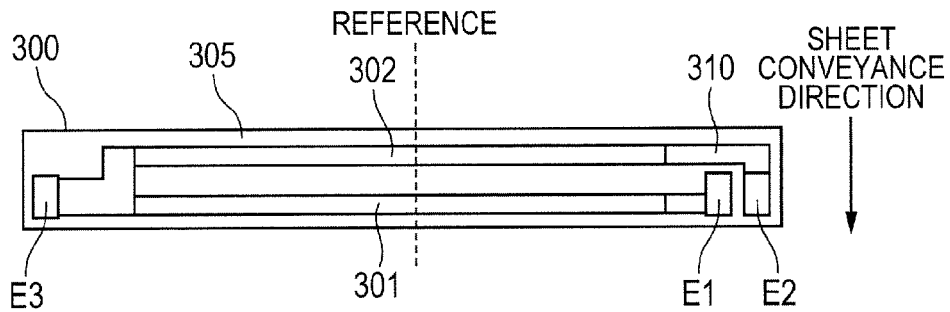
FIG. 2A is a diagram illustrating a heater of Embodiment 1.

FIG. 2A is a diagrammatic plan view illustrating a schematic configuration of the heater 300. The heat generating member 301 of the heater 300 is supplied with power via an electrode E1 and an electrode E3. The heat generating member 302 is supplied with power via an electrode E2 and the electrode E3. A conductor 310 connects the electrode to the heat-generating member. The electrodes E1 to E3 are each connected to a control unit 400. This embodiment adopts a configuration that improves the safety of the fixing apparatus 200 through the operation of the safety circuit 500 in the case where power is supplied only to the heat-generating member 301 or power is supplied only to the heat-generating member 302 owing to an after-mentioned failure of the control unit 400. FIG. 2A illustrates a "reference", which indicates a conveyance reference position on the recording material. The image forming apparatus of this example is in conformity with a center reference type, according to which the recording material conveyed while the center of the recording material in the width direction is maintained to match with conveyance reference.

Figure 2B:
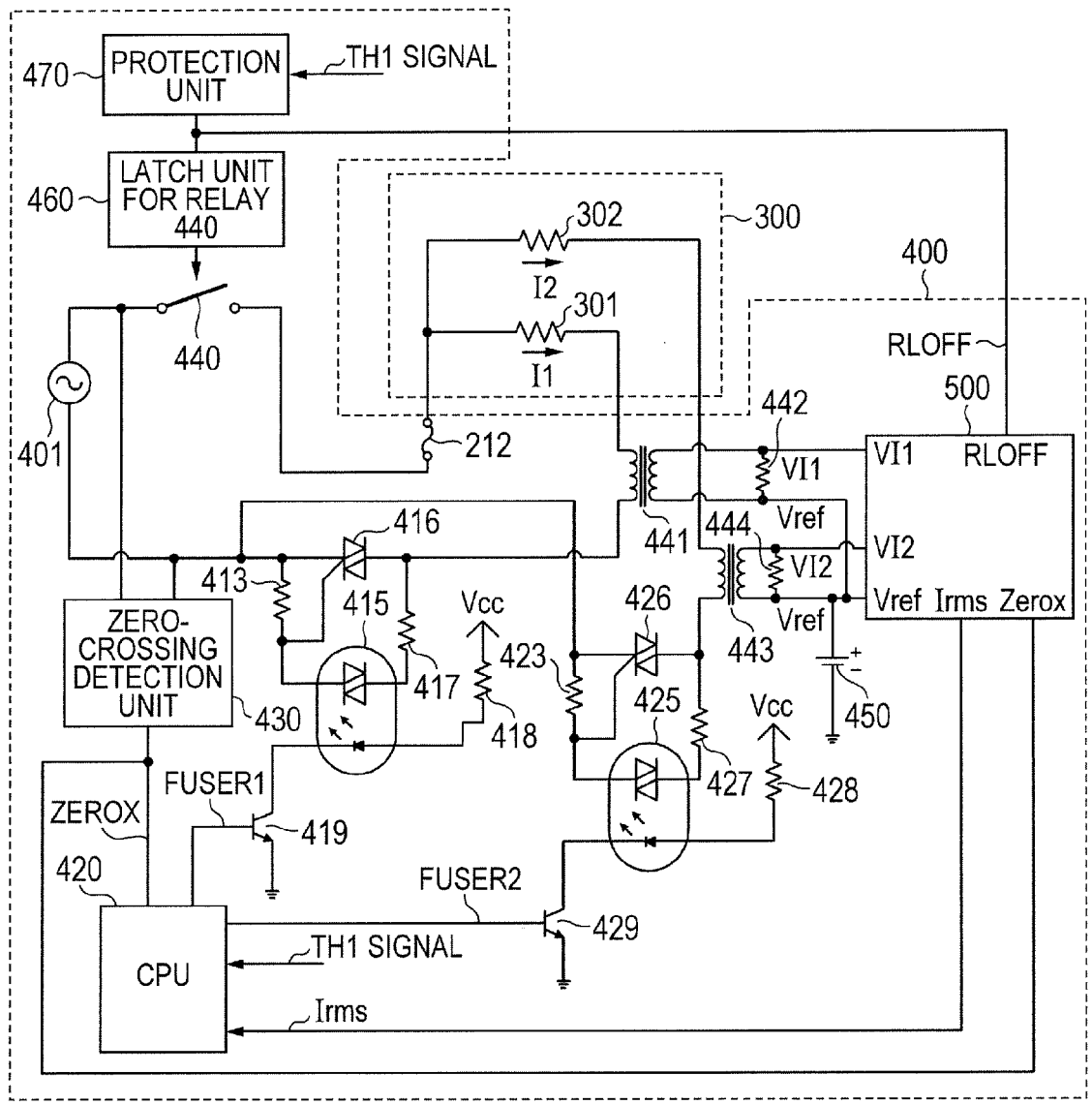
FIG. 2B is a diagram illustrating a control unit of the heater.

FIG. 2B illustrates a circuit diagram of the heater control unit 400 of Embodiment 1. A commercial AC power supply 401 is connected to the image forming apparatus 100. Power control for the heater 300 is performed by electrifying and cutting of triacs 416 and 426 of the control unit 400, which is a power control unit. When the triac (first driving element) 416 is brought into an electrified state, current I1 flows through the heat-generating member 301. Likewise, when the triac (second driving element) 426 is brought into the electrified state, current I2 flows through the heat-generating member 302. That is, power supply to the heat-generating members 301 and 302 is independently controlled by the respective triac 416 and the triac 426.

A zero-crossing detection unit 430 is a circuit detecting zero-crossing (i.e., a zero crossing point) of the AC power supply 401, and outputs a ZEROX signal to a CPU 420. The ZEROX signal is used for controlling the heater. An example of the zero-crossing circuit may be at circuit described in Japanese Patent Application Laid-Open No. 2011-18027.

In case where a failure of the control unit 400 brings the heater 300 into the thermal runaway state, a relay 440 is used as a unit (power cut-off unit) stopping the supplying of power to the heater 300. For instance, when the thermistor TH1 detects a temperature of at least a predetermined threshold or when the safety circuit 500 of this embodiment detects an abnormal state, the relay 440 is brought to the cut-off state to stop supplying power to the heater 300. Instead of the relay 440, the triac 416 and the triac 426 may be used as a unit stopping the supplying of power to the heater 300.

The operation of the triac 416 is described. The resistors 413 and 417 are bias resistors for the triac 416. A phototriac coupler 415 is a device for securing the creeping distance between the primary and secondary portions of the circuit configuration of the image forming apparatus 100. Electrification to a light-emitting diode of the phototriac coupler 415 turns on the triac 416. The resistor 418 is for limiting current in the light-emitting diode of the phototriac coupler 415. The transistor 419 burns on and off the phototriac coupler 415. The transistor 419 operates according to a FUSER1 signal from the CPU 420. When the triac 416 is brought into the electrified state, power is supplied to the heat-generating member 301.

The circuit operation of the triac 426 is the same as the operation of the triac 416. Accordingly, the description of the operation thereof is omitted. That is, resistors 423, 427 and 428 have the same configurations as the resistors 413, 417 and 418 have, respectively. A phototriac coupler 425 has the same configuration as the phototriac coupler 415 has. A transistor 429 has the same configuration as the transistor 419. The triac 426 operates according to a FUSER2 signal from the CPU 420. When the triac 426 is brought into the electrified state, power is supplied to the heat-generating member 302.

The temperature detected by the thermistor TH1 is detected by the CPU 420 as a TH1 signal, which is a voltage divided with a resistor, not illustrated. The CPU 420 corresponds to a control unit that controls each of the first driving element 416 and the second driving element 426. The internal processes of the CPU 420 calculate the power supplied according to, for instance, PI control, based on the temperature detected by the thermistor TH1 and the temperature set in the heater 300. The processes further converts the calculated result into a control level of a phase angle (phase control) and a wave number (wave number control) corresponding to the power to be supplied, and control the triacs 416 and 426 under the control condition thereof.

When the temperature detected by the thermistor TH1 exceeds set upper limit temperature THmax, a protection unit 470 operates an after-mentioned latch unit 460 to hold the electricity to the heater 300 in the cut-off state.

Figure 2C:
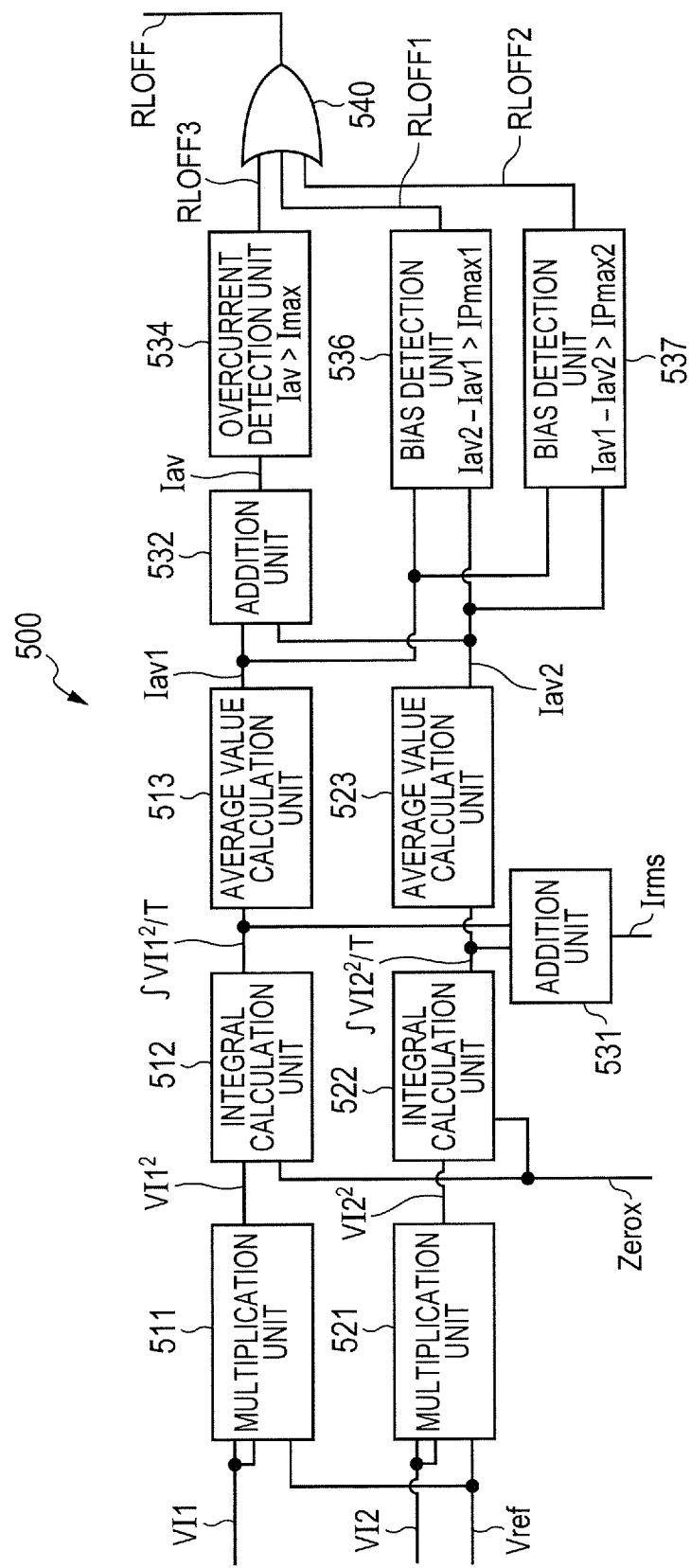
FIG. 2C is a diagram illustrating a configuration of a safety circuit.
Figure 3:
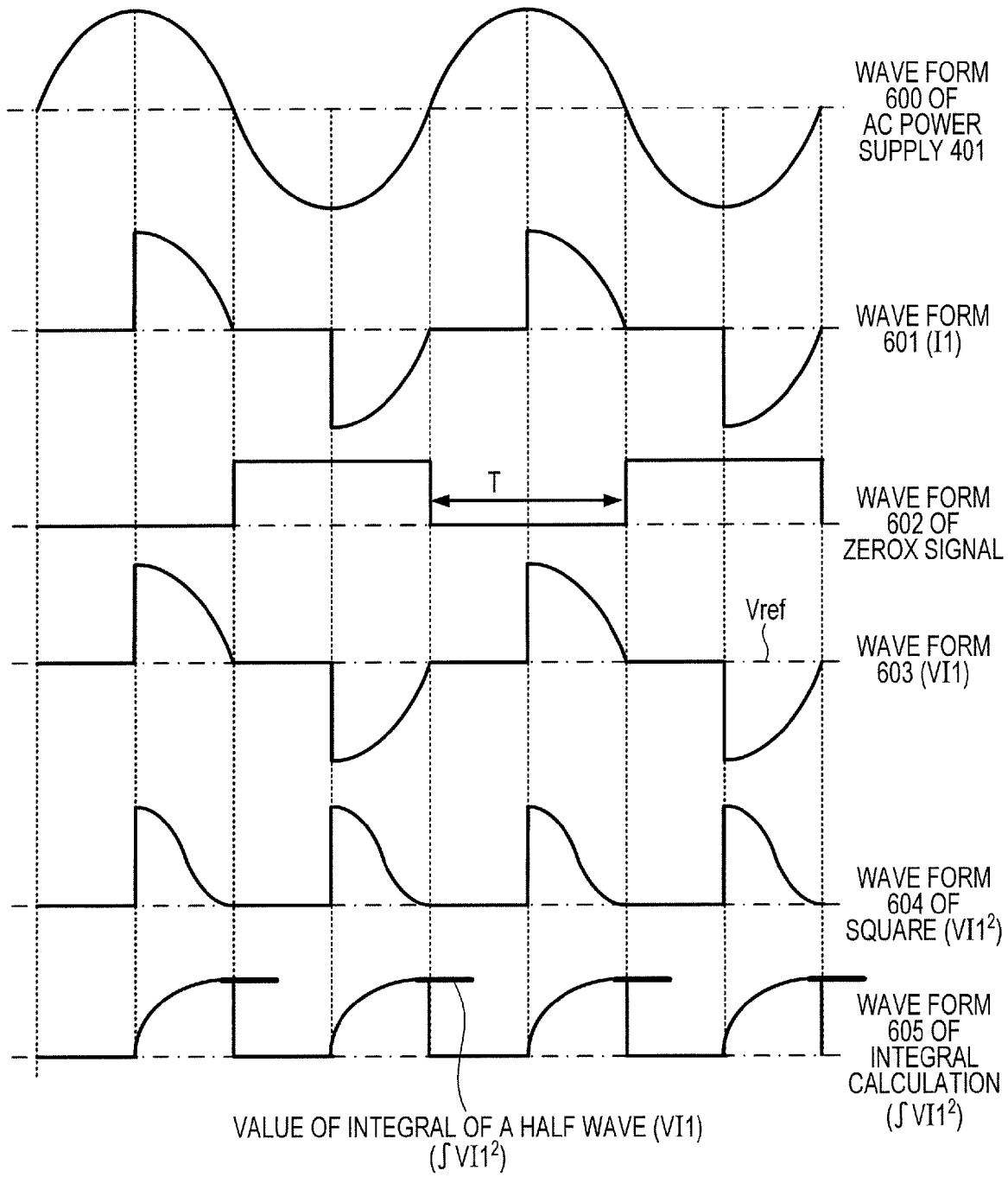
FIG. 3 is a diagram illustrating operations of the safety circuit of Embodiment 1.

FIG. 2C illustrates the safety circuit (semiconductor integrated circuit) 500 of the heater 300 of Embodiment 1. FIG. 3 illustrates a wave form diagram for illustrating the internal processes of the safety circuit 500. Power that is illustrated as a wave form 600 in FIG. 3 and supplied from the AC power supply 401 (a sinusoidal wave with a frequency of 50 Hz) to the heat-generating member 301 is controlled by the triac 416. A wave form 601 illustrates a current wave form of the heat-generating member 301 controlled by the triac 416 (a wave form 601 illustrates the case of being phase-controlled to have a 50% power).

An output VI1 (wave form 603) a current transformer (first detection unit) 441 is such that the voltage (a first output) VI1 (wave form 603), which is proportional to the current I1 flowing through the heat-generating member 301, is output with reference to a reference voltage Vref. A damping resistor 442 is for the current transformer 441. The reference voltage Vref is a constant reference voltage output from a reference voltage source 450 using a shunt regulator.

A ZEROX signal (wave form 602) is an output of the zero-crossing detection unit 430. Here, this signal has 50 Hz in synchronization with the zero crossing of the voltage wave form (the wave form 600) of the AC power supply 401.

A multiplication unit 511 causes an A/D converter to sample the difference signal between the output VI1 of the current transformer 441 and the reference voltage Vref, and calculates a square $VI1^2$ of the voltage (the wave form 604). As illustrated as a wave form 605, an integral calculation unit 512 integrates the output $VI1^2$ of the multiplication unit 511 for each half cycle T of the zero-crossing signal, and calculates a value $\int VI1^2/T$, which is the division of the integrated result by a half cycle T of the zero-crossing signal.

An average value calculation unit 513 calculates an average value of the output $\int VI1^2/T$ of the integral calculation unit 512 for a predetermined time period (here, an average value for one second). The predetermined time period is longer than half the cycle of the AC wave form of each of the first and second heat-generating members. Since the frequency of the AC power supply 401 is 50 Hz, an average value Iav1 for 100 half waves is calculated. The output value Iav1 may be calculated by a method of calculating the average value each second or a method of calculating the moving average value for one second on each half cycle T of the zero-crossing signal. The average value calculation unit 513 of this embodiment uses the method of calculating the moving average value for one second on each half cycle T of the zero-crossing signal.

The operation method in the safety circuit 500 for an output (second output) VI2 of a current transformer (second detection unit) 443 is the same as the method for the output VI1. Accordingly, the description thereof is omitted. A damping resistor 444 is a resistor of the current transformer 443. A multiplication unit 521 has the same configuration as the multiplication unit 511. An integral calculation unit 522 has the same configuration as the integral calculation unit 512. An average value calculation unit 523 has the same configuration as the average value calculation unit 513. Accordingly, the description of these elements is omitted. An addition unit 531 calculates the addition value of the output $\int VI1^2/T$ of the integral calculation unit 512 and the output $\int VI2^2/T$ of the integral calculation unit 522, and outputs this value as an Irms signal to the CPU 420.

The Irms signal is a total value of the square of the current effective value for half T of the zero-crossing signal flowing in heat-generating members 301 and 302, and is used for power control for the heater 300 by the CPU 420. For instance, the Irms signal is used to control the current effective value of the heater 300 to be a predetermined current value or less. The maximum duty ratio (maximum duty) that can be supplied to the heater 300 is calculated as follows. That is, the maximum duty is calculated based on the input duty ratio at present (here, a 50% duty ratio illustrated as the wave form 601) of power supplied to the heater 300 and on the current detection result of the Irms signal. For instance, when a current effective value of 10 A is detected, the maximum duty to be acquired to control the current effective value to be 12 A or less at an input duty ratio of 50% is $50\% \times (12\ A^2 \div 10\ A^2) = 72\%$. The detailed method of calculating the maximum duty may be a method described in Japanese Patent Application Laid-Open No. 2007-212503.

An addition unit 532 outputs the addition value Iav of the output Iav1 of the average value calculation unit 513 (the first current value; the value according to the first output) and the output Iav2 of the average value calculation unit 523 (the second current value; the value according to the second output). An overcurrent detection unit 534 determines whether Iav exceeds a predetermined threshold (the second threshold) IMAX or not. If it is determined that Imax is exceeded (Iav>Imax), an RLOFF3 signal is brought into a high state. Thus, the relay 440 is brought into the cut-off state, and electricity supplied to the heater 300 is cut off.

If Iav2 becomes larger than Iav1 by a predetermined threshold (first threshold) IPmax1 (Iav2−Iav1>IPmax1), a bias detection unit 536 brings an RLOFF1 signal into the high state, brings the relay 440 into the cut-off state and cuts off electricity to the heater 300. If Iav1 becomes larger than Iav2 by a predetermined threshold (second threshold) IPmax2 (Iav1−Iav2>IPmax2), a bias detection unit 537 brings an RLOFF2 signal into the high state, brings the relay 440 into the cut-off state and cuts off electricity to the heater 300.

If a predetermined relationship (in this embodiment, Iav2−Iav1>IPmax1 or Iav1−Iav2>IPmax2) is thus detected, the bias detection unit 536 detects a state where the bias in power supplied to the heat-generating member 301 and the heat-generating member 302 is abnormally high.

As will be described later with reference to FIGS. 4A and 4B, this state of the abnormally high bias in power is a state where a stress exceeding a predetermined value (e.g., a stress that can break the substrate 305) can locally occur in the substrate 305 of the heater 300. To prevent the substrate 305 from being broken, the bias detection unit 536 operates the after-mentioned latch unit 460 to hold electricity to the heater 300 in the cut-off state.

If the bias detection unit 536 detects the predetermined relationship (in this embodiment, Iav2−Iav1>Ipmax1 or Iav1−Iav2>IPmax), the following method may be adopted instead, of operation of the after-mentioned latch unit 460. That is this method limits electricity to the heater 300 to an intermittent state (intermittently in the cut-off state) and limits power supplied to the heater 300 to a low power to thereby alleviate the stress in the substrate 305.

If the bias detection unit 536 detects the predetermined relationship (this embodiment, Iav2−Iav1>IPmax1 or Iav1−Iav2>IPmax2), the upper limit temperature set in the protection unit 470 may be switched to a low temperature. This switching can stop the rise in temperature of the heater 300 at a low temperature, and alleviate the stress applied to the substrate 305.

Likewise, if the bias detection unit 536 detects the predetermined relationship (in this embodiment, Iav2−Iav1>IPmax1 or Iav1−Iav2>IPmax2), electricity may be cut off or power is limited that is for only one of the heat-generating member 301 and the heat-generating member 302. For instance, in a biased state (bias heating state) where power supplied to the heat-generating member 302 is higher than the power supplied to the heat-generating member 301 (Iav2−Iav1>IPmax1), the triac 426 is used to cut off the electricity to the has member 302 or limit the power to this member. In a biased state, the power supplied to the heat-generating member 301 is higher than the power supplied to the heat-generating member 302 (Iav1−Iav2>IPmax2), and the triac 416 is used to cut off the electricity to the heat-generating member 301 or limit the power to this member.

When any one of the RLOFF1 signal, the RLOFF2 signal and the RLOFF3 signal assumes the high state, a three-input OR gate circuit 540 sets the RLOFF signal to the high state. The RLOFF signal corresponds to a cut-off signal for stopping supplying power to at least one of the first heat-generating member and the second heat-generating member. Once the RLOFF signal assumes the high state, a latch unit 40 or the relay 440 holds the relay 440 in the cut-off state until the power supply enters an OFF state.

Figure 4A:
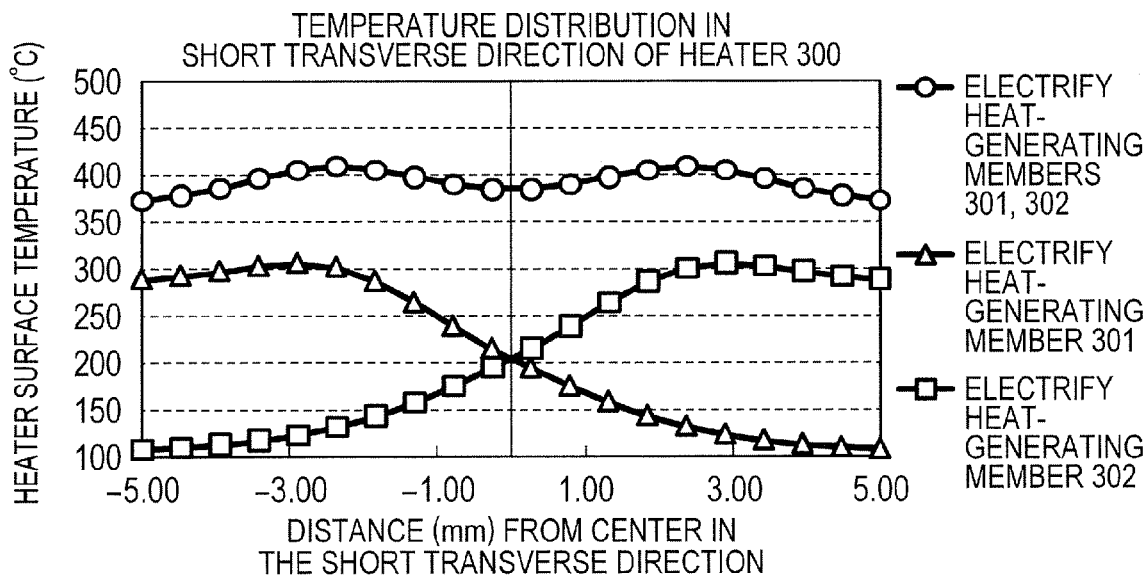
FIG. 4A is a diagram illustrating a temperature distribution of the heater in a short transverse direction in Embodiment 1.
Figure 4B:
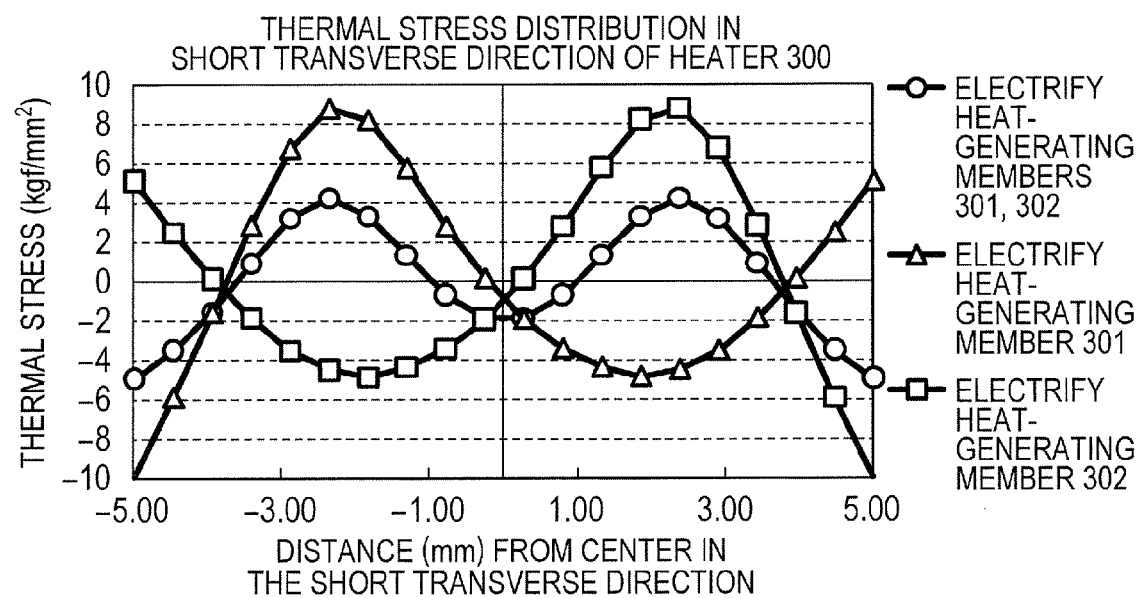
FIG. 4B is a diagram illustrating a thermal stress distribution of the heater in the short transverse direction.

FIG. 4A illustrates a temperature distribution in the short transverse direction (the direction orthogonal to the longitudinal direction) of the heater 300. FIG. 4B illustrates a stress distribution of the heater 300 in the short transverse direction in the temperature distribution of the FIG. 4A. FIGS. 4A and 4B assume the case where the heater 300 enters the thermal runaway state owing to a failure of the control unit 400. FIGS. 4A and 4B illustrate the temperature distribution and the stress distribution, respectively, a predetermined time after the heater 300 enters the thermal runaway state, in the case of electrifying the heat-generating members 301 and 302, the case electrifying only the heat-generating member 301, and the case of electrifying only the heat-generating member 302. Simulations illustrated in FIGS. 4A and 4B are examples for illustrating the advantageous effects of the present invention. The simulations do not limit the scope to which the present invention is applicable.

As illustrated in FIG. 4A, in the case of electrifying both, the heat-generating members 301 and 302, the temperature of the heater becomes a maximum. However, the temperature distribution is symmetric with respect to the short transverse direction of the heater 300, and the temperature gradient is small. The power supplied in each of the case of electrifying only the heat-generating member 301 and the case of electrifying only the heat-generating member 302 is half of the power supplied in the case of electrifying both the heat-generating members 301 and 302. However, as illustrated in FIG. 4A, the temperature distribution is asymmetric with respect to the short transverse direction and has a high temperature gradient. Accordingly, it can be seen that, as illustrated in FIG. 4B, in the case of electrifying only the heat-generating member 301 and the case of electrifying only the heat-generating member 302, a large stress is applied to an end of the substrate 305 in the short transverse direction. If such large stress is applied to the end of the substrate 305, the substrate 205 is sometimes broken before the safety element 212 operates. A method of using the safety circuit 500 of this embodiment to detect the biased state of current in the heater 300 and stooping supplying power to the heater 300 is effective in protecting the fixing apparatus 200 in the case of electrifying only the heat-generating member 301 and the case of electrifying only the heat-generating member 302.

Electrification only to the heat-generating member 301 and electrification only to the heat-generating member 302 in the heater 300 cause at least a predetermined amount of bias of power supplied to the heat-generating member 301 and the heat-generating member 302. In such a case, an unbalanced temperature distribution occurs in the short transverse direction of the heater 300. This temperature distribution brings the apparatus into a state that can cause a stress locally exceeding a predetermined value in the heater 300 (substrate 305). This state is defined as a bias heating state of the heater 300 (substrate 305).

Figure 5:
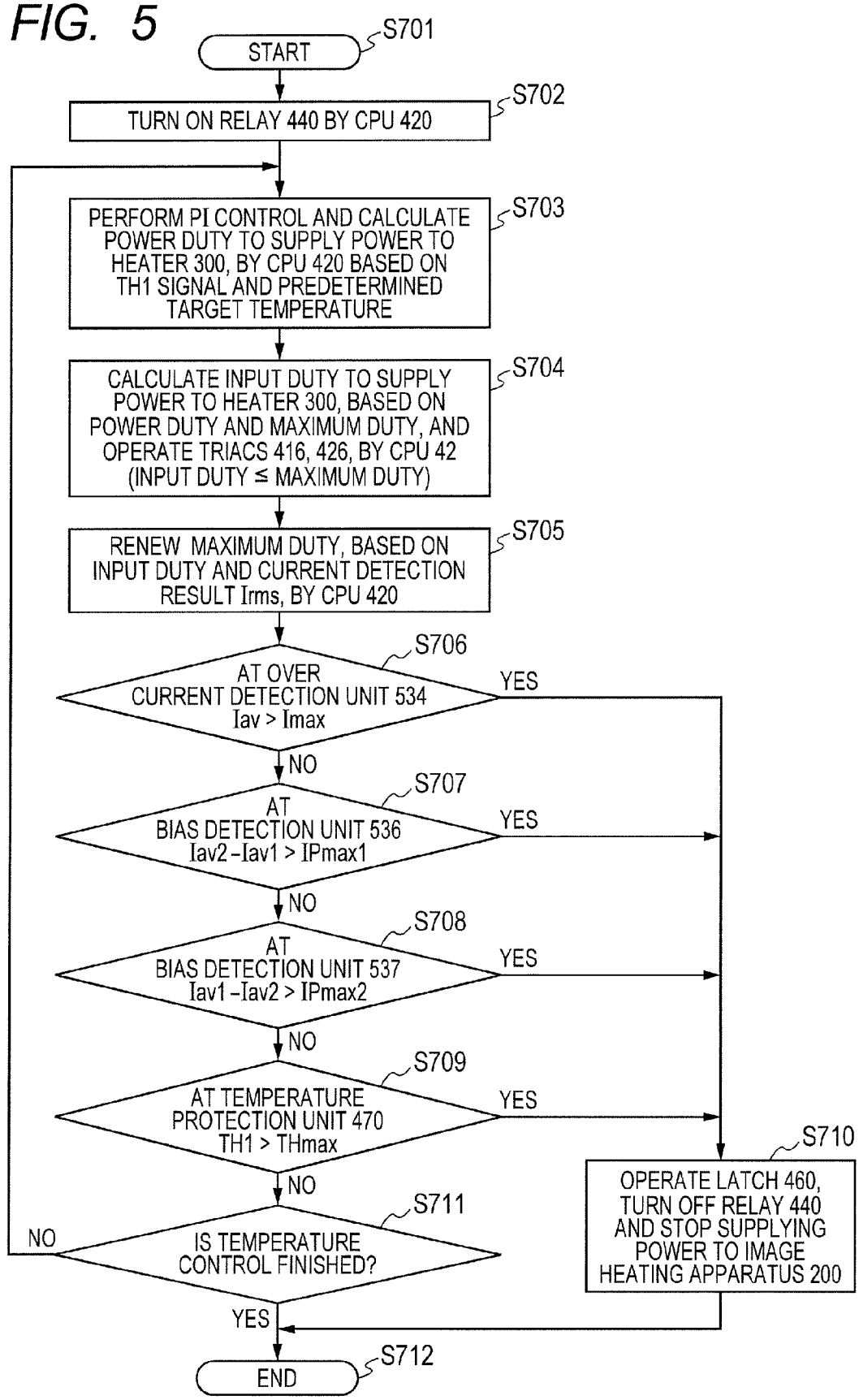
FIG. 5 is a diagram illustrating a flowchart of control of Embodiment 1.

FIG. 5 is a flowchart illustrating a control sequence for the fixing apparatus 200 by the CPU 420 of the control unit 400 and the safety circuit 500.

When a request for starting temperature control for the heater 300 occurs in S701, the CPU 420 brings the relay 440 into an ON state (electrified state) in S702. In the CPU 420 performs PI control and calculates a power duty ratio (first duty ratio) to supply power to the heater 300, based a TH1-signal-based temperature detected by the heater 300 and a predetermined target temperature.

In S704, the CPU 420 calculates a duty ratio (second duty ratio) to be actually applied to the heater 300, based on the power duty (first duty ratio) and the maximum duty (the initial value of the maximum duty is 100%), and operates the triads 416 and 426. If the first duty ratio is the maximum duty or less, the power duty calculated by the PI control is used as be duty input into the heater 300 (second duty ratio). If the first duty ratio is higher than the maximum duty, the maximum duty is used as the duty input into the heater 300 (second duty ratio).

In S705, the CPU 420 calculates the maximum duty suppliable to the heater 300 from the input duty applied to the heater 300 and the Irms-signal-based current value flowing through the heater 300, and renews the maximum duty value.

In S706, the overcurrent detection unit 534 of the safety circuit 500 determines whether Iav exceeds a predetermined threshold Imax. If it is determined that Iav exceeds Imax (Iav>Imax), the processing proceeds to S710, the RLOFF3 signal is set to the high state, the latch unit 460 is operated to hold the relay 440 in the cut-off state, and power supply to the fixing apparatus 200 is stopped.

In S707, the bias detection unit 535 of the safety circuit 500 determines whether or not the output Iav2 of the average value calculation unit 523 is higher than the output Iav1 of the average value calculation unit 513 by the predetermined threshold IPmax1. If the value acquired by subtracting Iav1 from Iav2 is higher than IPmax1 (Iav2−Iav1>IPmax1), the processing proceeds to S710, the RLOFF1 signal is set to the high state, the latch unit 460 is operated, and the relay 440 is held in the cut-off state.

In S708, the bias detection unit 537 of the safety circuit 500 determines whether or not the output Iav1 of the average value calculation unit 513 is higher than the output Iav2 of the average value calculation unit 523 by the predetermined threshold IPmax2. If the value acquired by subtracting Iav2 from Iav1 is higher than IPmax2 (Iav1−Iav2>IPmax2), the processing proceeds to S710, the RLOFF2 signal is set to the high state, the latch unit 460 is operated, and the relay 440 is held in the cut-off state.

In S709, if the temperature detected by the thermistor TH1 exceeds the upper limit temperature THmax, the protection unit 470 operates the latch unit 460, and holds the relay 440 in the cut-off state.

The above processes are repeatedly performed. When finish of the temperature control is detected in S711, the control sequence for the fixing apparatus 200 is finished in S712.

As described above, the bias detection units 536 and 537 detect whether the relationship indicating the occurrence of a biased state where a stress locally exceeding a predetermined value in the heater 300 (substrate 305) occurs between the values of currents flowing in the respective heat-generating members 301 and 302. The predetermined thresholds IPmax1 and IPmax2 in the relationship are appropriately set according to the product specifications of the heater 300 in view of whether the biased state occurs or not. It is a matter of course that the magnitude of stress that can break the heater 300 is different according to the product specifications. In the configuration including the same type heat-generating members 301 and 302, such as in the heater 300 in this embodiment, it can be considered that the bias is detected by only one relational expression. However, the resistance values and the heating distributions of the heat-generating members are different owing to individual differences in some cases. The cases where allowable current biases are different can be considered. Accordingly, as with this embodiment, the relational expression and the threshold are desired to be configured and detected for each heat generating member.

Therefore, through use of the safety circuit 500 in this Embodiment 1, the case where the power supplied to the heater 300 is low, but the biases in power supplied to the heat-generating members 301 and 302 are high, can be detected as a failure state. This detection can improve the reliability of the fixing apparatus 200 including the heater 300 and, in turn, improve the reliability of the image forming apparatus 100.

Embodiment 2

Referring to FIGS. 6A to 6C and 7A and 7B, an image forming apparatus according to Embodiment 2 of the present invention is described. This embodiment is different from Embodiment 1 in configuration of a heater mounted on a fixing apparatus 200. A description of the analogous configuration elements to the elements in Embodiment 1 is omitted.

Figure 6A:
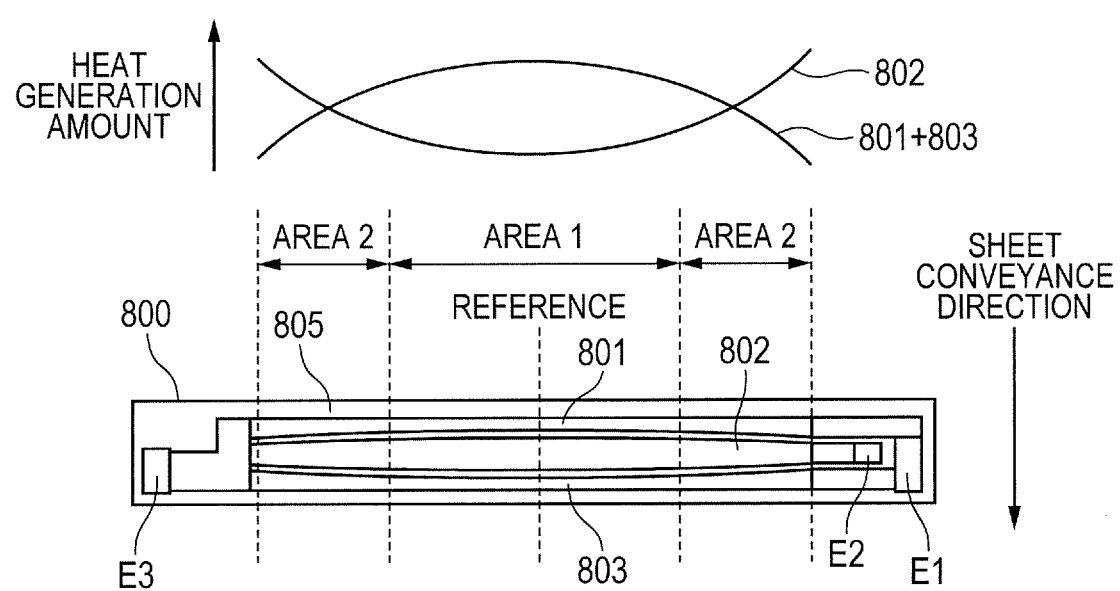
FIG. 6A is a diagram illustrating a heater of Embodiment 2.

FIG. 6A is a diagrammatic plan view illustrating a schematic configuration of a heater 800 of this embodiment. The heater 800 includes multiple heat-generating members having different heating distributions in the longitudinal direction of this heater 800. As described in Japanese Patent No. 4208772, this heater is effective in reducing the temperature rise in a non-sheet-passing unit that is generated when a small-sized sheet is thermally fixed using the fixing apparatus 200. That is the image forming apparatus 100 according to the embodiment of the present invention supports multiple sheet sizes, and can print sheets with different sizes, such as a letter sheet (ca. 216 mm×279 mm) and an A5 sheet (148 mm×210 mm), set in a sheet feeding cassette 11. This apparatus is basically a printer that longitudinally conveys a sheet (conveys the sheet such that the long sides are parallel to the conveyance direction). A sheet with the maximum (maximum width) size among standard recording material sizes supported by the image forming apparatus 100 (supported sheet sizes in a catalog) is a letter sheet. That is, a sheet having a sheet width (e.g., A5 sheet) smaller than the maximum size supported by the apparatus is defined as the small-sized sheet in this embodiment.

A heat-generating member 801 (first heating unit) is formed so as to extend along the longitudinal direction on one end side with respect to the center in the short transverse direction of a substrate 805. A heat-generating member 803 (second heating unit) is formed so as to extend along the longitudinal direction on the other end side with respect to the center. The heat-generating member 801 and the heat-generating member 803 are electrically connected to each other in parallel as first heat-generating members, and supplied with power via an electrode E1 and an electrode E3. A heat-generating member 802 is formed as a second heat-generating member so as to extend along the longitudinal direction between the heat-generating members 801 and 803, and supplied with power via an electrode E2 and the electrode E3. Each of the electrodes E1 to E3 is connected to a control unit 810.

That is, as to the conveyance direction of a recording material, at least one first heat-generating member 801 (803) is provided on each of the upstream side and the downstream side with respect to the second heat generating member 802. With respect to the direction orthogonal to the conveyance direction of the recording material, the first heat-generating member 801 (803) has a resultant heat distribution where the heat amount in a first area (AREA1) including a conveyance reference of the recording material is higher than the heat amount in a second area (AREA2), which is farther apart from the conveyance reference than the first area. In the first area the heat amount of the second heat-generating member 802 is lower than the resultant heat amount of the first heat-generating members 801 (803) (the sum of the heat amount of the heat-generating member 801 the heat amount of the heat-generating member 803).

Figure 6B:
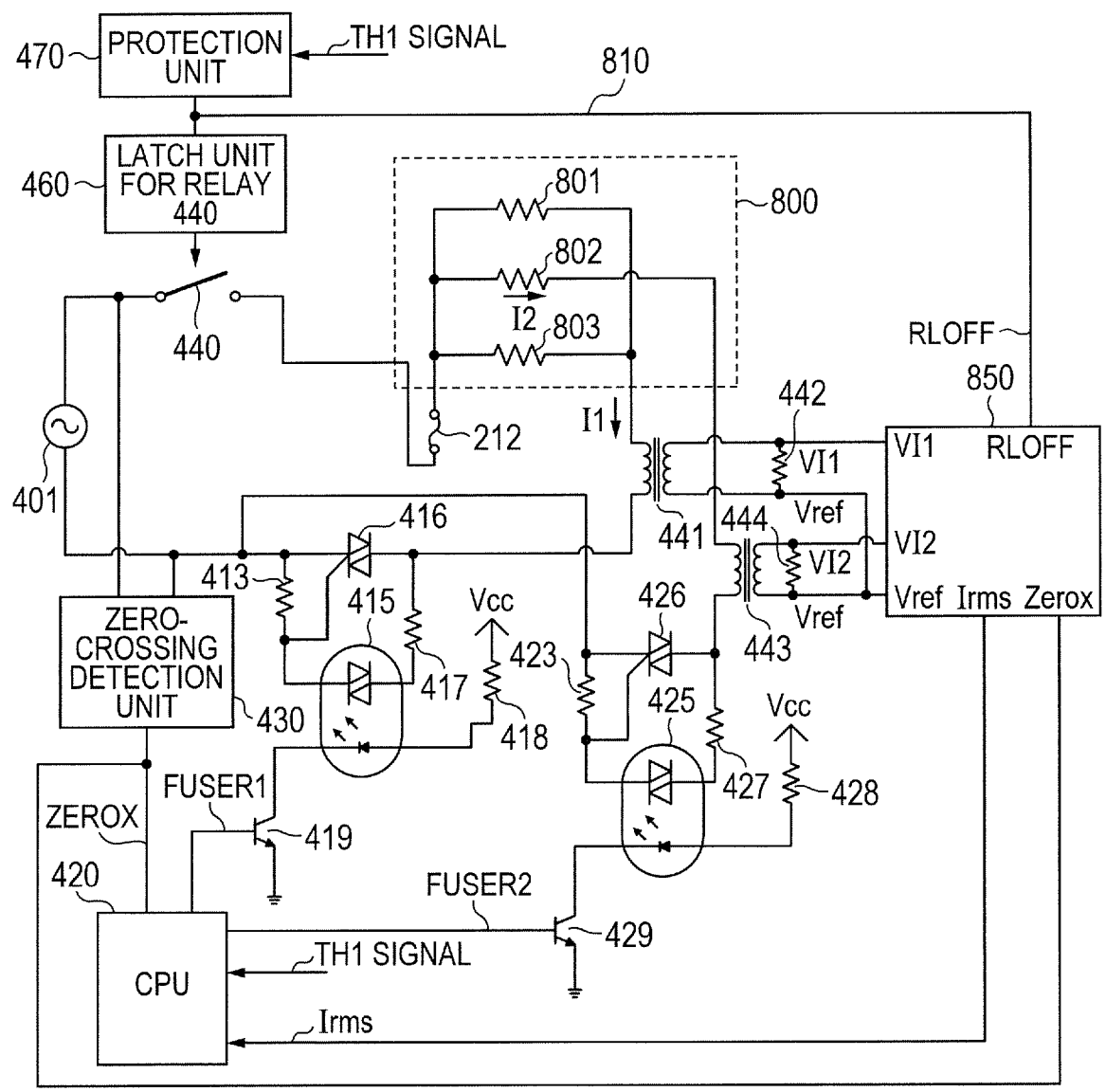
FIG. 6B is a diagram illustrating a control unit of the heater.

FIG. 6B illustrates the heater control unit 810 of Embodiment 2 Power control of the heater 800 is performed by electrifying and cutting off triacs 416 and 426 of the control unit 310. When the triac 416 is brought into an electrified state, a current I1 flows as a combined current of the heat-generating member 801 and the heat-generating member 803. Likewise, when the triac 426 is brought into the electrified state, a current I2 flows through the boat-generating member 802.

In this embodiment, in the case of supplying power only to the heat-generating member 802 of the heater 800 owing to a failure of the control unit 310, the safety of the fixing apparatus 200 can be improved using the safety circuit 850.

Figure 7A:
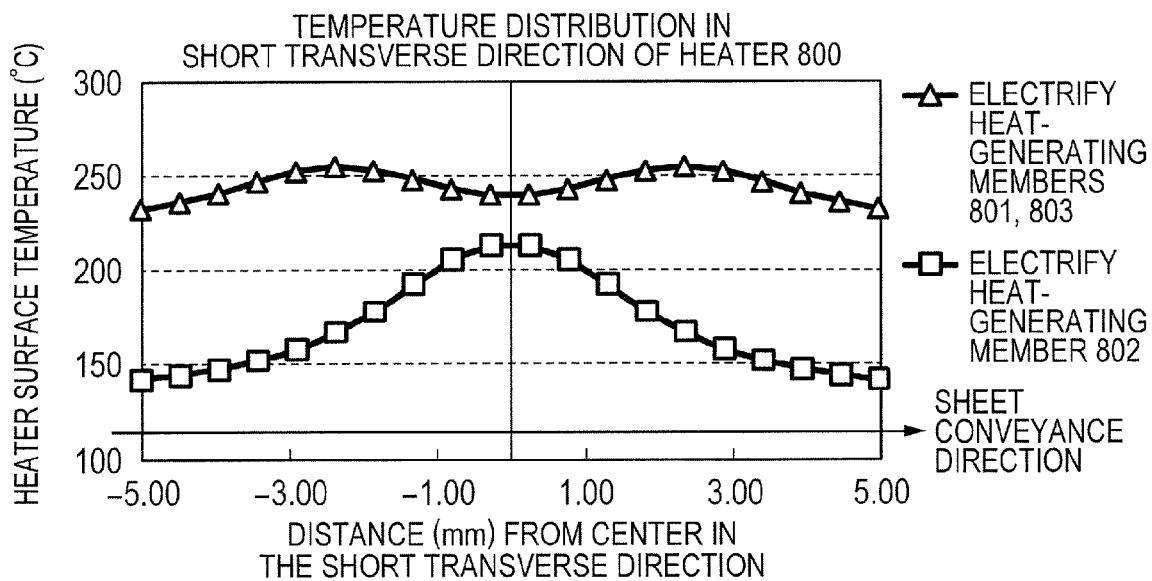
FIG. 7A is a diagram illustrating a temperature distribution of the heater in short transverse direction in Embodiment 2.
Figure 7B:
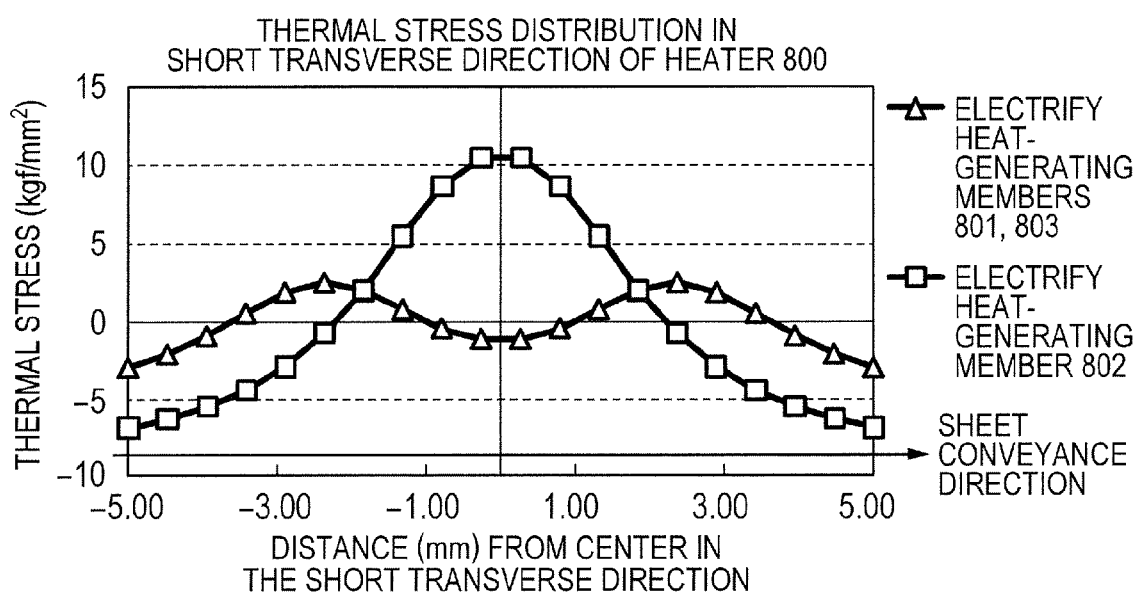
FIG. 7B is a diagram illustrating a thermal stress distribution of the heater in the short transverse direction.

FIG. 7A illustrates a temperature distribution of the heater 800 in the conveyance reference (reference) in a short transverse direction. FIG. 7B illustrates a stress distribution of the heater 800 in the short transverse direction with the temperature distribution of FIG. 7A. In FIGS. 7A and 7B, the case of thermal runaway of the heater 800 due to a failure of the apparatus is assumed. These diagrams illustrate the temperature distribution and the stress distribution predetermined time after thermal runway of the heater 800 in the case where the heat-generating members 801 and 803 are electrified and the case where only the heat-generating member 802 is electrified. A simulation to be described with reference to FIGS. 7A and 7B is an example for describing advantageous effects of the present invention, and does not limit the scope to which the present invention is applied.

In FIG. 7A, when the heat-generating members 801 and 803 are electrified, the temperature distribution is symmetric with respect to the short transverse direction of the heater 800, and temperature gradient is small. When only the heat-generating member 802 is electrified, the temperature gradient is high, as illustrated in FIG. 7A. Accordingly, it can be seen that, as illustrated in FIG. 7B, when only the heat-generating member 802 is electrified, a large stress is applied to both the ends and the center in the short transverse direction of the heater 800 (substrate 805). The application of such a large stress to both the ends and the center of the substrate 805 sometimes breaks the heater 800 before the safety element 212 operates. A method of using the safety circuit 850 of this embodiment to detect a biased state of current in the heater 800 and stop supplying power to the heater 800 is effective in protecting the fixing apparatus 200 during electrifying only the heat-generating member 802.

In the heating distribution of the heat-generating members 801 and 803 of the heater 800 in the heater longitudinal direction, the heat amount at the center in the longitudinal direction of the heater 800 is larger than the heat amount at each end in the longitudinal direction. Accordingly, during a thermal fixing process for a small-sized sheet, the triacs 416 and 426 are used to perform control such that the heat amount of the heat-generating members 801 and 803 is larger than the heat amount of the heat-generating member 802. Thus, in the safety circuit 850 of this embodiment, when the output Iav1 of the average value calculation unit 513 becomes higher than the output Iav2 of the average value calculation unit 523, the safety circuit 850 is prevented from operating. That is, when the value acquired by subtracting the value according to the first output Iav1 from the value according to the second output Iav2 exceeds the threshold IPmax1, the safety circuit 850 outputs a cutoff signal RLOFF. Note that when the value according to the first output Iav1 is greater than the value according to the second output Iav2, this circuit does not output the cut-off signal.

When the output Iav2 of the average value calculation unit 523 becomes higher than the output Iav1 of the average value calculation unit 513 (Iav2−Iav1>IPmax1), the safety circuit 850 sets the RLOFF1 signal to the high state. This setting operates the latch unit 460, and holds the relay 440 in the cut-off state. A two-input OR gate circuit 851 sets the RLOFF signal to the high state when any one of the RLOFF1 and RLOFF3 signals enters the high state.

Embodiment 3

Figure 8A:
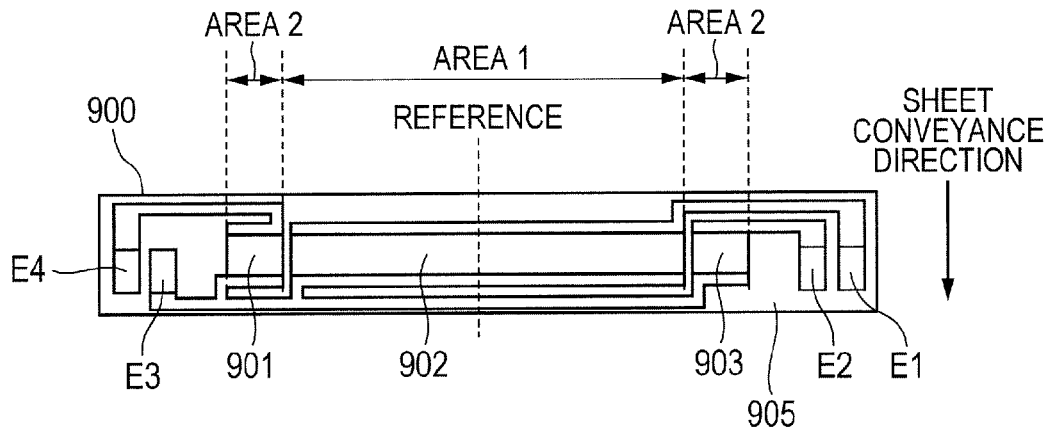
FIG. 8A is a diagram illustrating a heater of Embodiment 3.
Figure 8B:
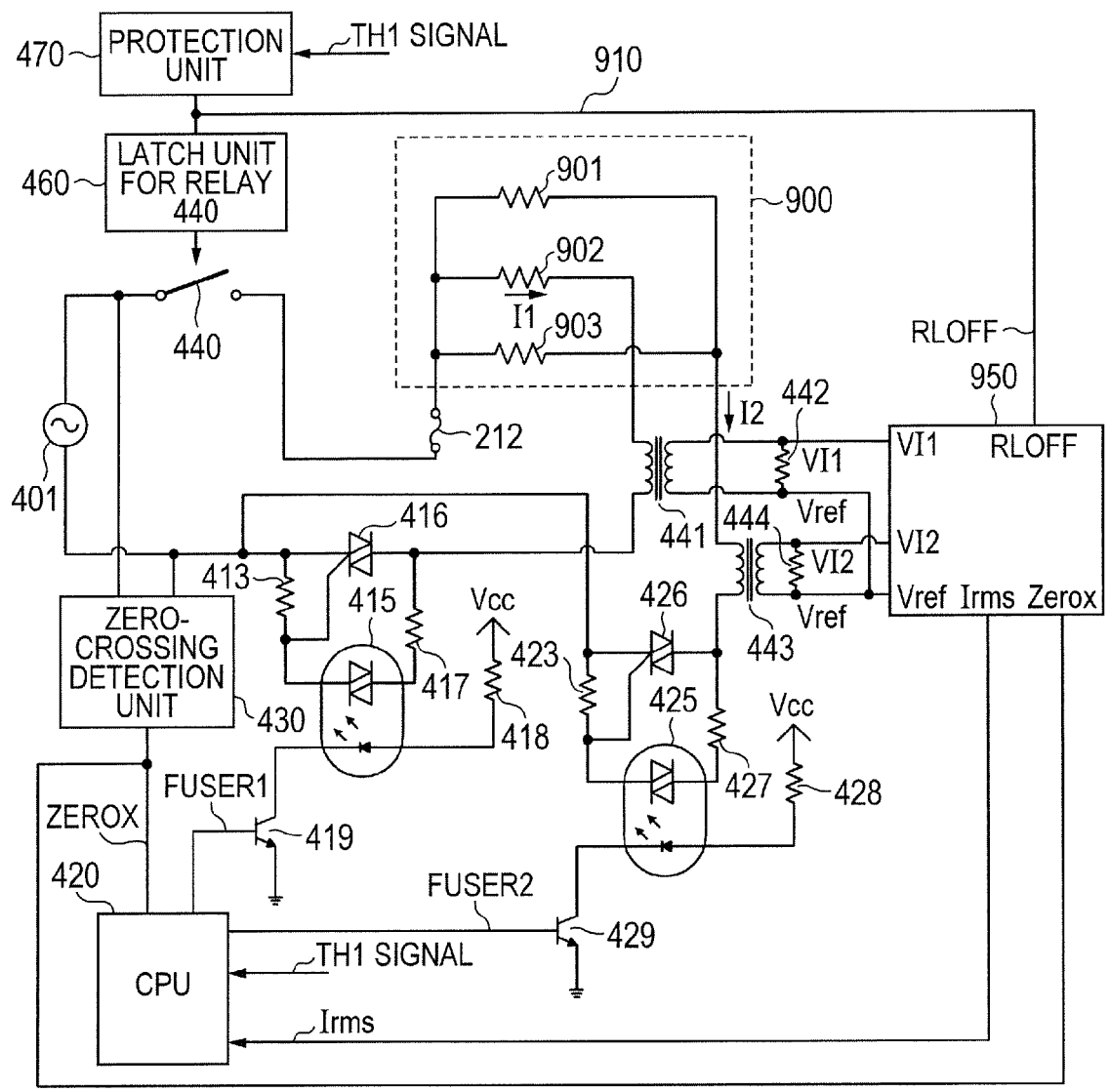
FIG. 8B is a diagram illustrating a control unit of the heater.
Figure 8C:
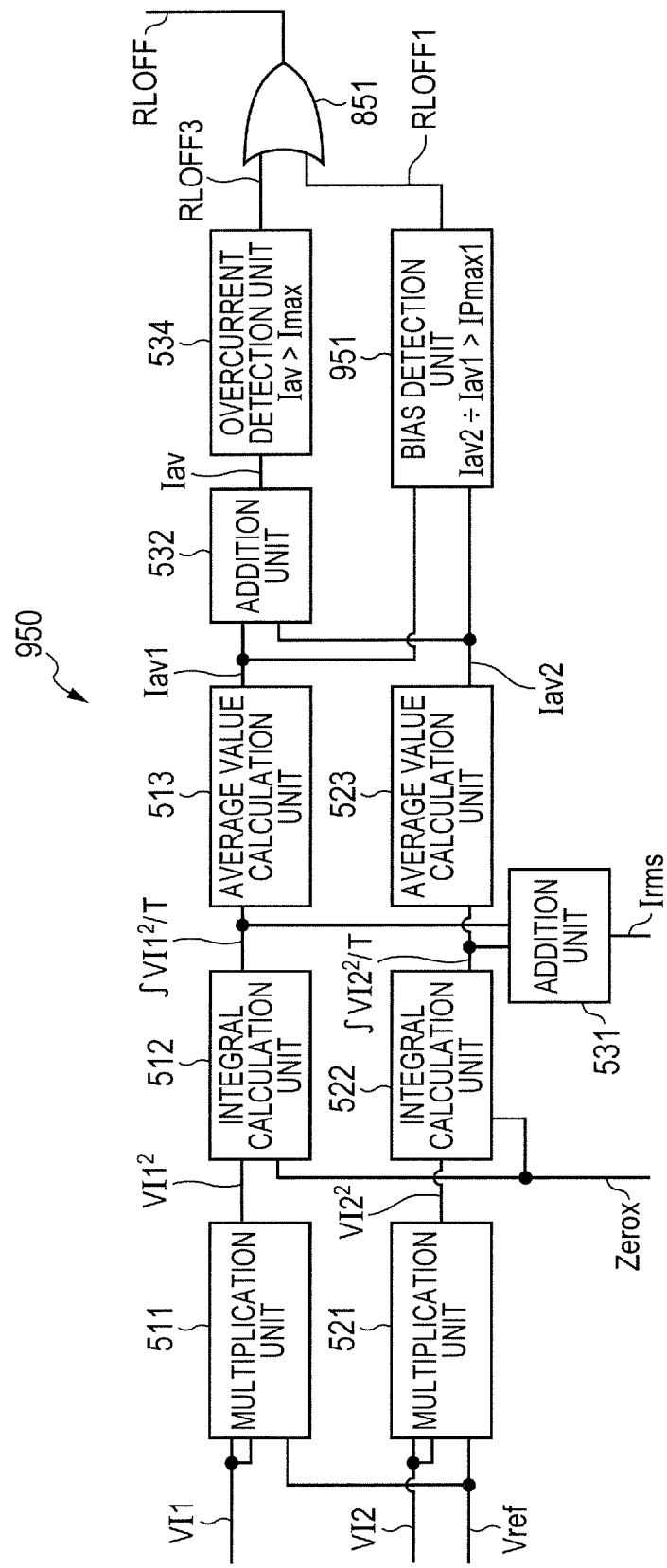
FIG. 8C is a diagram illustrating a configuration of a safety circuit.

Referring to FIGS. 8A to 8C, an image forming apparatus according to Embodiment 3 of the present invention is described. This embodiment is different from Embodiments 1 and 2 in the configuration of a heater mounted in a fixing apparatus 200. A description of the configuration elements analogous to elements in Embodiments 1 and 2 is omitted.

A heater 900 illustrated in FIG. 8A is divided into three heat-generating members 901, 902 and 903 in the heater longitudinal direction. During thermal fixing of a small-sized sheet, the heater 900 electrifies only the heat-generating block 902 and is thereby effective in reducing the temperature rise in a non-sheet-passing unit. The heat-generating member 901 (first heating unit) is formed at one end side in the longitudinal direction of the substrate 905, and the heat-generating member 903 (second heating unit) is formed at the other end side in the longitudinal direction. That is, the first heat-generating member 902 is arranged only in a first area (AREA1) including a conveyance reference of the recording material. The second heat-generating members 901 and 903 are arranged only in second areas (AREA2) that are farther apart from the conveyance reference than the first area. The heat-generating members 901 and 903 are electrically connected to each other in parallel as the first heat-generating members, and are supplied with power via electrodes E2, E3 and E4. The heat-generating member 902, which serves as the second heat-generating member, is formed so as to extend in the longitudinal direction between the heat-generating members 901 and 903, and supplies power via the electrodes E1 and E3. Each of the electrodes E1 to E4 is connected to the control unit 910.

FIG. 8B illustrates the heater control unit 910 of Embodiment 3. Power control of the heater 900 is performed by electrifying and cutting off the triacs 416 and 426. When the triac 416 is set to the electrified state, a current I1 flows in the heat-generating member 902. Likewise, when the triac 426 is set to the electrified state, a current I2 flows as a combined current in the heat-generating members 901 and 903. In this embodiment, a method is described that uses a safety circuit 950 to improve the safety of the fixing apparatus 200 in the case of supplying power only to the heat-generating members 901 and 903 of the heater 900 owing to a failure of the control unit 910.

When the output of the average value calculation unit 523 becomes higher by a predetermined threshold ratio IPmax1 than the output Iav1 of the average value calculation unit 513 (Iav2÷Iav1>IPmax1), a bias detection unit 951 of the safety circuit 950 sets the RLOFF1 signal to the high state. That is, when the bias detection unit 951 detects that a relationship holds where a value acquired by dividing Iav2 by Iav1 is greater than the predetermined value IPmax1, the safety circuit 950 operates the latch unit 460 to hold the relay 440 in the cut-off state. In other words, when the value acquired by dividing the value according to the second output Iav2 by the value according to the first output Iav1 exceeds the predetermined threshold IPmax1, the safety circuit 950 outputs the cut-off signal RLOFF for stopping supplying power to at least one of the first and second heat-generating members.

In the case where a bias occurs so as to increase bower supplied to the heat-generating members 901 and 903, such as the case where only the heat-generating members 901 and 903 are electrified, a temperature distribution in the heater 900 occurs in the longitudinal direction of the heater 900. According to this temperature distribution a stress exceeding a predetermined value can locally occur in the heater 900 (substrate 905) even in the case where the temperature detected by the safety element 212 is low. This state is defined as a bias heating state of the heater 900 (substrate 905).

In the heater 900, the safety element 212 is in contact with the surface of the substrate 905 opposite to the surface provided with the heat-generating member 902 in an area residing at the rear of the heat-generating member 902. Accordingly, when only the heat-generating members 901 and 903 are electrified, the safety element 212 does not operate in some cases. Thus, even if the power supplied to the heater 900 is small, electrification only to the heat-generating members 901 and 903 does not operate the safety element 212 in some cases. Accordingly, this embodiment has a configuration that operates the safety circuit 950 even with a small power supplied to the heater 900 when only the heat-generating members 901 and 903 are electrified. When Iav2 becomes higher than Iav1 by a predetermined threshold ratio, the safety circuit 950 of this embodiment is characterized in determining the detection of the bias heating state.

Variation 1 of Embodiment 1

Figure 9A:
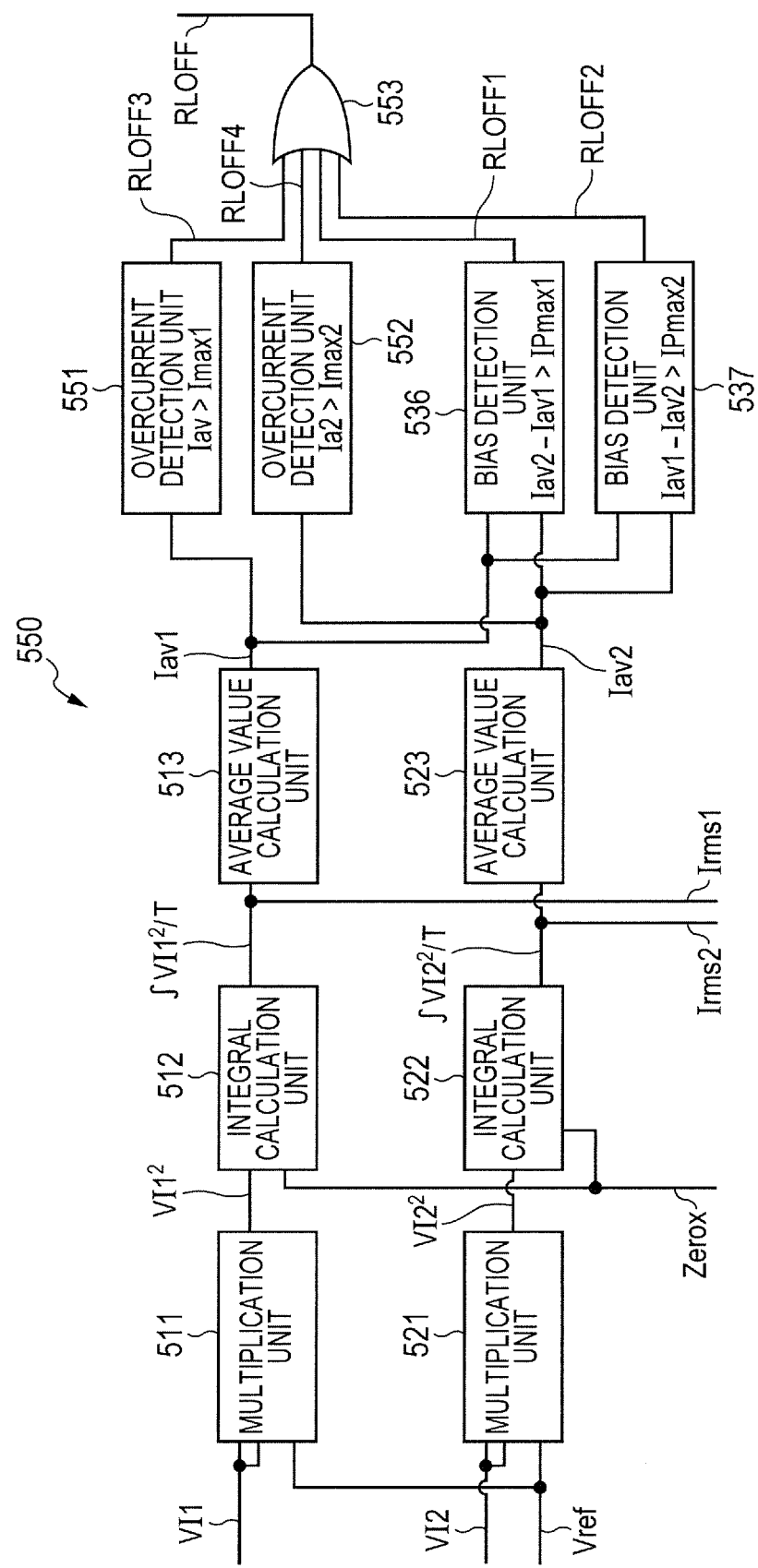
FIGS. 9A and 9B are diagrams illustrating variations of the safety circuit of Embodiment 1.

A safety circuit 550 illustrated in FIG. 9A is a variation of the safety circuit 500 in Embodiment 1. A description of the same configuration elements as the elements of safety circuit 500 is omitted. The configuration elements analogous to the elements of this variation may be adopted to the safety circuits in the respective Embodiments 2 and 3.

In the safety circuit 550, predetermined thresholds Imax1 and Imax2 are assigned to the current I1 flowing through the heat-generating member 301 of the heater 300 and the current I2 flowing through the heat-generating member 302, respectively. When the output Iav1 of the average value calculation unit 513 exceeds the predetermined threshold Imax1 (Iav1>Imax1), an overcurrent detection unit 551 sets the RLOFF3 signal to the high state. When the output Iav2 of the average value calculation unit 523 exceeds the predetermined threshold Imax2 (Iav2>Imax2), this detection unit sets the RLOFF4 signal to the high state and brings the relay 440 into the cut-off state. When any one of the RLOFF1, RLOFF2, RLOFF3 and RLOFF4 signals enters the high state, a four-input OR gate circuit 553 sets the RLOFF signal to the high state.

An Irms1 signal has a square of the current effective value for a half cycle T of a zero-crossing signal of current flowing through the heat-generating member 301. An Irms2 signal is a square of the current effective value for a half cycle T of a zero-crossing signal of current flowing through the heat-generating member 302. The Irms1 and Irms2 signals are used for communication with the CPU 420.

In the case of setting the currents I1 and I2 to have different maximum current values, such as the case where the heat-generating members 301 and 302 have different resistance values, a safety circuit 550 is desired to be used.

Variation 2 of Embodiment 1

Figure 9B:
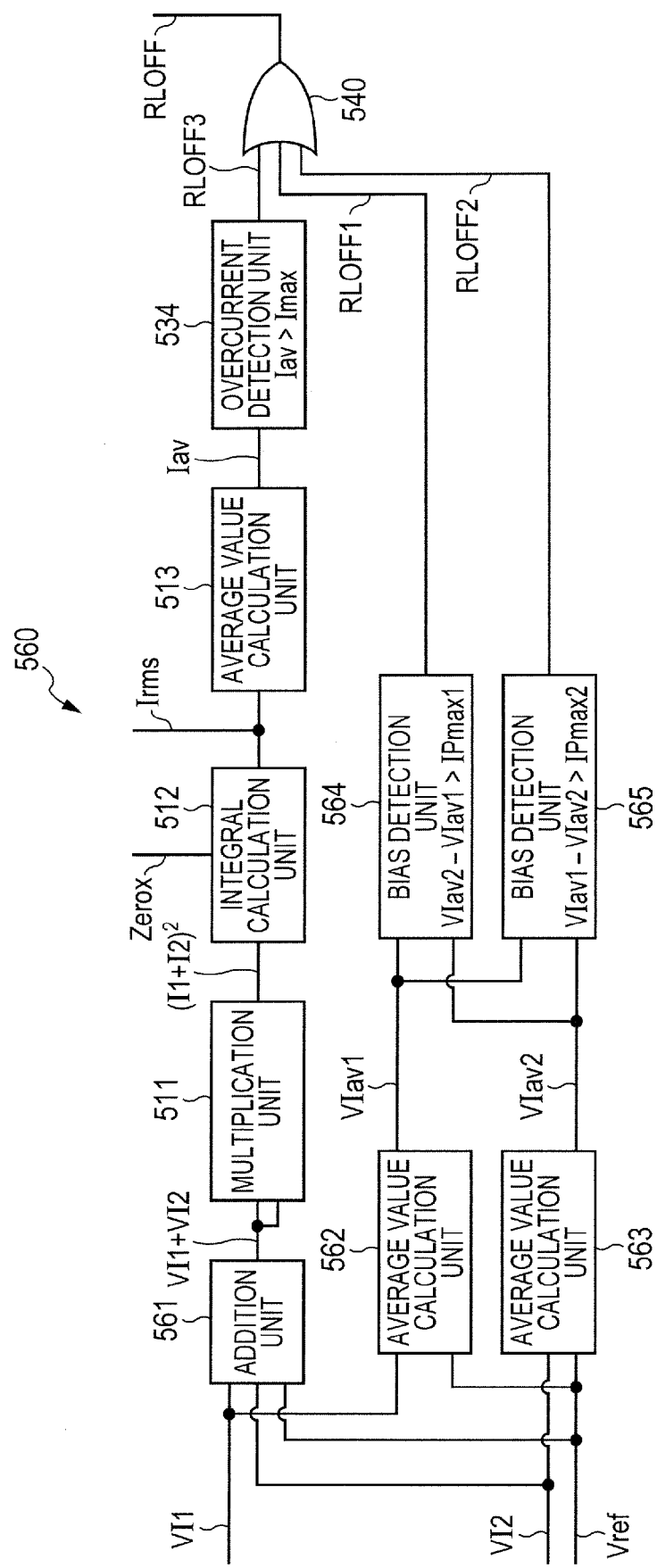

A safety circuit 560 illustrated in FIG. 9B is a variation of the safety circuit 500 in Embodiment 1. A description of the same configuration elements as the elements of the safety circuit 500 is omitted. The configuration elements analogous to the elements of this variation may be adopted to the safety circuits in the respective Embodiments 2 and 3.

The safety circuit 560 performs a process that causes an addition unit 561 to add VI1 corresponding to current I1 flowing through the heat-generating member 301 of the heater 300 to VI2 corresponding to current I2 flowing through the heat-generating member 302 and subsequently calculates a square of the effective value. While the safety circuit 500 requires the calculation of the square of the effective value for two inputs, the safety circuit 560 only requires the calculation of the square of effective value for one input. Accordingly, an IC having a relatively slow operation process speed can be adopted. In the case of calculating an effective value using an analog electric circuit as described in Japanese Patent Application Laid-Open No. 2007-212503, the size of the required circuit can be reduced.

Adoption of the addition unit 561 before the operations in the multiplication unit 511 and the integral calculation unit 512 is effective in the case where the effective current value of the combined current of the current I1 flowing through the heat-generating member 301 and the current I2 flowing through the heat-generating member 302 is required to be controlled.

An average value calculation unit 562 causes an A/D converter to sample the difference signal between the output VI1 of the current transformer 441 and the reference voltage Vref, and calculates VIav1 (first voltage value), which is the average value of the absolute value of the difference value in a predetermined time period. An average value calculation unit 563 causes an A/D converter to sample the difference signal between the output VI2 of the current transformer 443 and the reference voltage Vref, and calculates VIav2 (second voltage value), which is the average value of the absolute value of the difference value in a predetermined time period.

The safety circuit 500 of Embodiment 1 uses the effective values (the root-mean-squares of the effective values) of the currents I1 and I2 for detecting the bias heating state. Meanwhile, the safety circuit 560 uses average values of the currents I1 and I2. That is, physical quantities other than the effective values of currents I1 and I2 may be used for detecting the bias heating state. For instance, the peak values and quasi-peak values of currents I1 and I2 may be adopted.

When VIav2 becomes higher than VIav1 by the predetermined threshold IPmax1 (VIav2−VIav1>IPmax1), a bias detection unit 564 sets the RLOFF1 signal to the high state, operates the latch unit 460 and holds the relay 440 in the cut-off state. When VIav1 becomes higher than VIav2 by the predetermined threshold IPmax2 (VIav1−VIav2>IPmax2), a bias detection unit 563 sets the RLOFF2 signal to the high state, operates the latch unit 460 and holds the relay 440 in the cut-off state.

Embodiment 4

Figure 10:
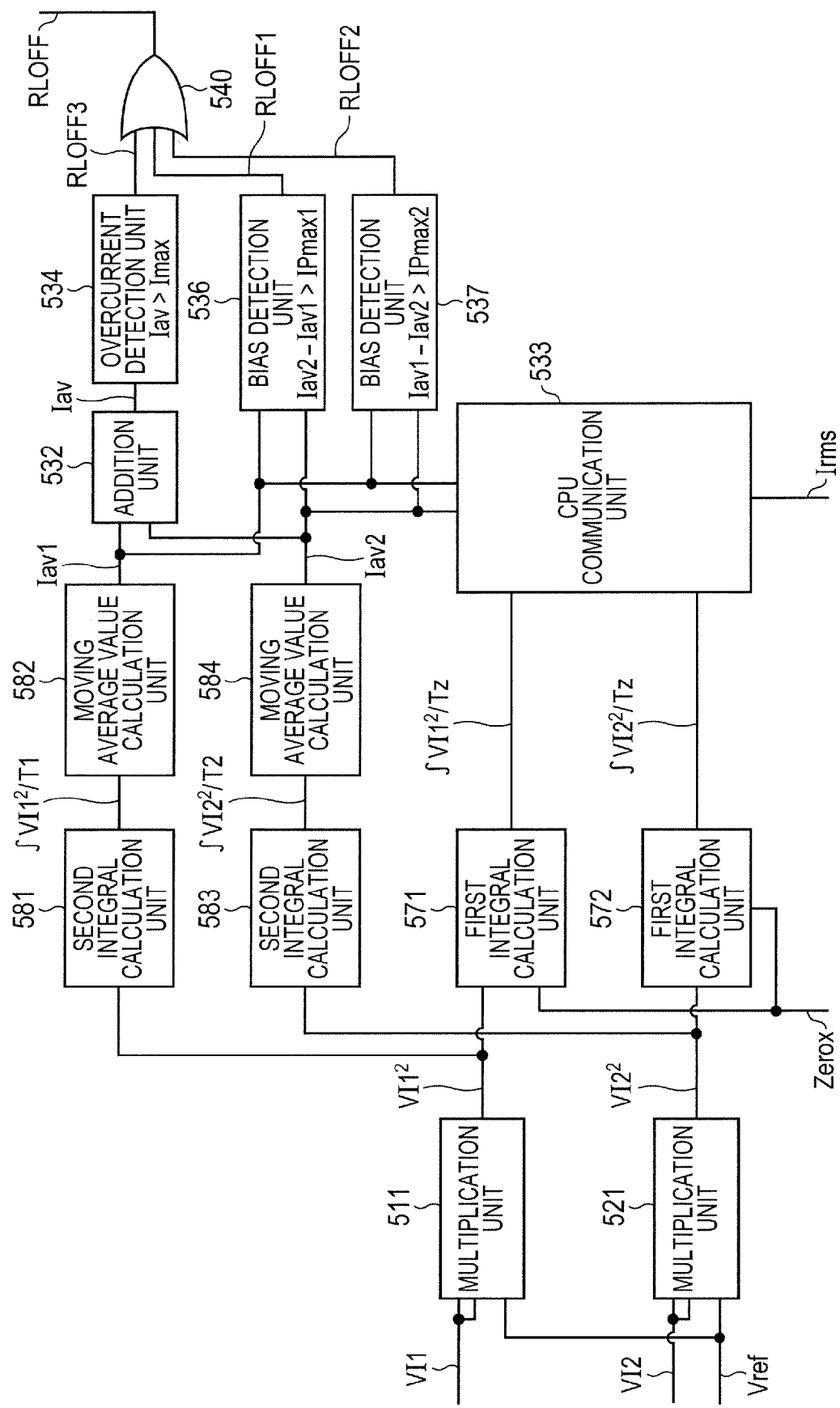
FIG. 10 is a diagram illustrating a configuration of a safety circuit of Embodiment 4.

Referring to FIGS. 10, 11A and 11B, a safety circuit of this embodiment is described. This embodiment is different from Embodiment 1 in the configuration of a safety circuit. A description of the configuration elements analogous to the elements in Embodiment 1 is omitted.

FIG. 10 illustrates the safety circuit of this embodiment. First integral calculation units 571 and 572 perform operations equivalent to the operations of the integral calculation units 512 and 522 described in Embodiment 1. That is the first integral calculation unit 571 integrates the output VI1$^2$ of the multiplication unit 511 every half cycle Tz of a zero-crossing signal, and calculates a value $(\int VI1^2)/Tz$, which is acquired by dividing the integrated result by half cycle Tz of the zero-crossing signal. A second integral calculation unit 581 integrates the output VI1$^2$ of the multiplication unit 511 every set time T1, which is independent of the half cycle Tz of the zero-crossing signal, and calculates a value $(\int VI1^2)/T1$ of the integrated result divided by the set time T1.

The moving average value calculation unit 513 calculates a predetermined-time moving average value (e.g., 32-time moving average value) of the output Iav1=$(\int VI1^2)/T1$ of the second integral calculation unit 581. For instance, provided that the set time T1 is 32 msec, 32 msec×32=1024 msec; according to this setting, a moving average value for about one second is calculated.

The first integral calculation unit 572 has the same configuration as the first integral calculation unit 571 has. A second integral calculation unit 583 has the same configuration as the second integral calculation unit 581. A moving average value calculation unit 584 has the same configuration as the moving average value calculation unit 582. Accordingly, the description thereof is omitted.

A CPU communication unit 533 receives the output $(\int VI1^2)/Tz$ of the first integral calculation unit 571, the output $(\int VI2^2)/Tz$ of the first integral calculation unit 572, the output Iav1 of the moving average value calculation unit 582, and the output Iav2 of the moving average value calculation unit 584. The CPU communication unit 533 sequentially outputs the pieces of data as communication data Irms signal to the CPU 420 (see FIG. 2B).

FIGS. 11A and 11B illustrate wave form diagrams for illustrating the internal process of the safety circuit of this embodiment. As illustrated, in FIGS. 11A and 11B, the Iav1 (first current value) and the Iav2 (second current value) in this embodiment are generated the second integral calculation units 581 and 583 and the moving average value calculation units 582 and 584, which operate independent of the ZEROX signal. That is, the Iav1 (first current value) and Iav2 (second current value) are the moving average value of squares of current effective values in a predetermined time independent of the ZEROX signal. According to the circuit configuration of this embodiment, for instance, even in the case where the zero-crossing detection unit 430 (see FIG. 2B) fails and the ZEROX signal varies in frequency, or the case where noise is superimposed on the ZEROX signal, the reliability of the safety circuit is improved.

FIG. 11A is a diagram in the case where the ZEROX signal varies in frequency. In FIG. 11A, Xn which is the current effective value data $(\int VI1^2)/Tz$ in every half cycle Tz of the zero-crossing signal, can be correctly calculated even in case of an abnormality of the ZEROX signal. However, time $T_{32}$ for sequential 32 Xn is different from time T1. Accordingly, the value acquired by dividing 32 stacked Xn by time T1 is slightly different from the value acquired by dividing 32 stacked Xn by time $T_{32}$ (the true current effective value). Meanwhile, even in case of an abnormality of the ZEROX signal, the current effective value Y1=$(\int VI1^2)/T1$ in the cycle (time) T1 can be acquired through correct effective value calculation. Accordingly, the reliability of the safety circuit is improved.

Likewise, FIG. 11B is a diagram in the case where noise is superimposed on the ZEROX signal. In FIG. 11B, Xn, which is the current effective value data $(\int VI1^2)/Tz$ in every half cycle Tz of the zero-crossing signal, can be correctly calculated even in the case where noise superimposed on the ZEROX signal. However, because of a reason similar to that in FIG. 11A, the value acquired by dividing the 32 stacked Xn by time T1 is slightly different from the value acquired by dividing 32 stacked Xn by time $T_{32}$ (true current effective value). Meanwhile, even in the case where noise is superimposed on the ZEROX signal, the current effective value Y1=$(\int VI1^2)/T1$ in a cycle (time) T1 can be calculated through the correct effective value calculation. Accordingly, the reliability of the safety circuit is improved.

Embodiment 5

Figure 12A:
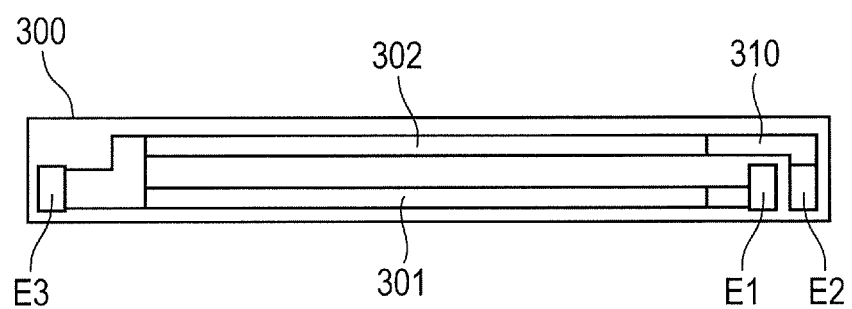
FIG. 12A is a diagram illustrating a heater of Embodiment 5.
Figure 12B:
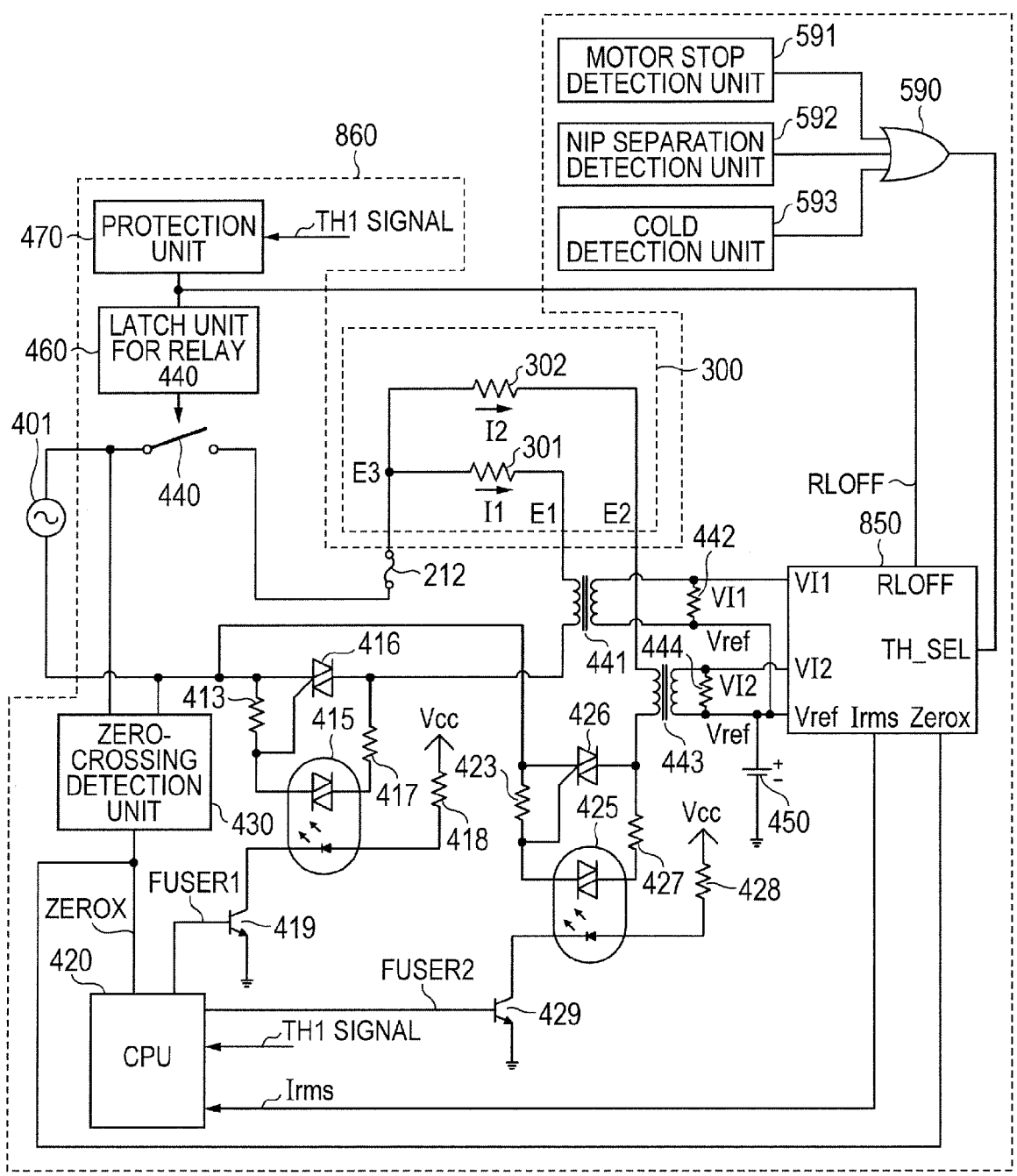
FIG. 12B is a diagram illustrating a control unit of the heater.
Figure 12C:
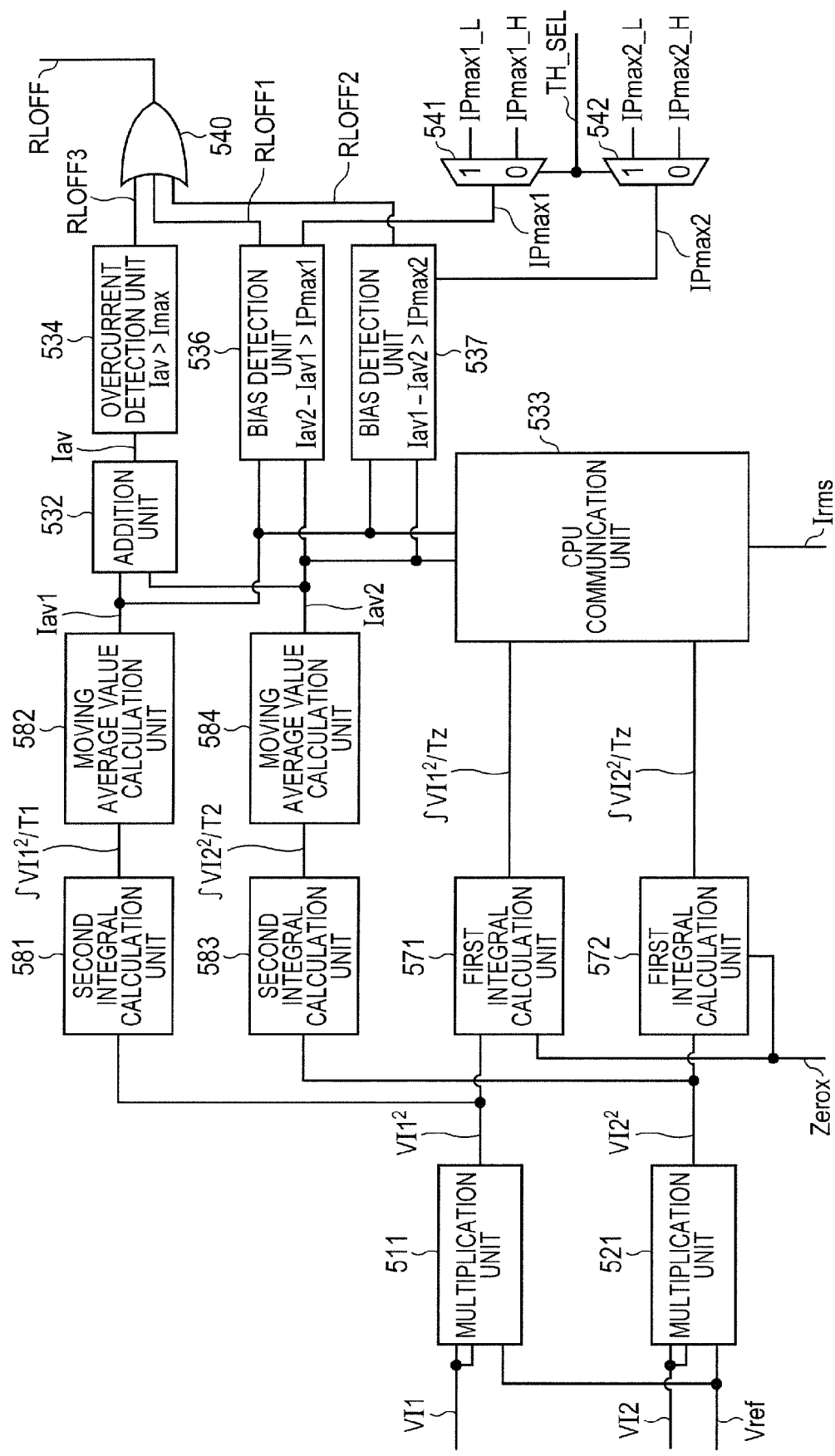
FIG. 12C is a diagram illustrating a configuration of a safety circuit.

Referring to FIGS. 12A to 12C, a safety circuit in this embodiment is described. This embodiment is different from Embodiment 1 in the configuration of safety circuit. A description of configuration elements analogous to the elements in Embodiment 1 is omitted.

The safety circuit of this embodiment has a configuration where the threshold is reduced if the time period from the occurrence of a bias heating state to breakage of the substrate 305 is short, and the threshold is increased if the time period to the breakage of the substrate is long.

The case where the time period to breakage of the substrate 305 is short is the case where the rotation of the pressure roller 208 is stopped, and the case where no fixing nip N is formed. In such cases, if power supply to the heater 300 becomes uncontrollable, the path for transferring heat generated by the heater 300 to another element is reduced, which increases the temperature rise rate in the heater 300. Accordingly, the time period until breakage of the substrate becomes short. Another case where the time period from the occurrence of the bias heating state to breakage of the substrate 300 is short may be the case where a long time elapses after the image forming apparatus stops a printing operation and the temperature of the heater 300 falls to a normal temperature. When power supply to the heater 300 becomes uncontrollable in a state where the heater is cool and a bias heating state occurs, the temperature difference in the substrate 305 becomes prominent, and the stress is focused on a part of the substrate. To address this problem, in such situations where the substrate 305 is break-prone, this example sets the threshold IPmax1 and the threshold IPmax2 to values as small as possible.

Meanwhile, when the image forming apparatus performs a printing operation, the patterns of current wave forms supplied to the respective heat-generating members 301 and 302 are different from each other. Accordingly, no small difference occurs between the output Iav1 of the moving average value calculation unit 513 and the output Iav2 of the moving average value calculation unit 523. It is thus required to prevent the safety circuit 850 from malfunctioning owing to a small difference caused to occur during the printing operation. Accordingly, during the printing operation, the threshold IPmax1 and the threshold IPmax2 are set to values higher than values set in situations where the substrate 305 is break-prone.

FIG. 12A is a diagrammatic plan view illustrating schematic configuration of the heater 300, which is analogous to that of Embodiment 1. Accordingly, the description thereof is omitted. FIG. 12B is a circuit diagram of a heater control unit 860 in Embodiment 5. The different points from the points in Embodiment 1 are hereinafter described. The heater control unit 860 of this example includes a motor stop detection unit 591 that detects that a motor (fixing motor) for driving a pressure roller 208 stops, a nip separation detection unit 592 that detects whether the fixing nip N is apart or not, and a cold detection unit 593 that detects whether the heater is in a cold state or not. The outputs of these detection units are input into a three-input OR gate circuit 590, and the result of this circuit is input as a TH_SEL signal into the safety circuit 850.

FIG. 12C illustrates the internal configuration of the safety circuit 850. In this configuration, the TH_SEL signal functions as a selection signal for selectors 541 and 542, and IPmax1_L or IPmax1_H is selected as IPmax1 while IPmax2_L or IPmax1_H is selected as IPmax2, according to the TH_SEL signal logic.

For instance, the motor 30 rotates while the image forming apparatus performs a printing operation, and the motor stop detection unit 591 outputs a Low signal. Likewise, during the printing operation, the pressure roller 208 is in contact with the film 202 to form the fixing nip N. Accordingly, the nip separation detection unit 592 outputs a Low signal. The heater is controlled so as to maintain a temperature sufficient to perform a fixing operation. Accordingly, the cold detection unit 593 outputs a Low signal. The OR gate circuit 590 receives these signals, and outputs a Low signal, which is the OR logic of these signals, as the TH_SEL signal, which is input into the safety circuit 850. According to the Low logic of the TH_SEL signal, the selectors 541 and 542 select IPmax1_H as IPmax1, and select IPmax2_H as IPmax2. Here, values larger than IPmax1_L and IPmax2_L (values corresponding to the thresholds in Embodiment 1) are set as IPmax1_H and IPmax2_H.

While the image forming apparatus stops the printing operation, the motor 30 is stopped and the motor stop detection unit 591 outputs a High signal. Likewise, during stopping printing, the pressure roller 208 is apart from the film 202, and the fixing nip N is not formed. Accordingly, the nip separation detection unit 592 outputs a High signal. The OR gate circuit 590 receives these signals, and outputs High signal, which is the OR logic of these signals, as TH_SEL signal, which is input into the safety circuit 850. According to the High logic of the TH_SEL signal, the selectors 541 and 542 select IPmax1_L as IPmax1, and select IPmax2_L as IPmax2.

The foregoing configuration can appropriately detect the bias heating state according to the operation situations of the image forming apparatus.

The heater control circuit illustrated in FIG. 12B and the safety circuit illustrated in FIG. 12C (not that the bias detection unit 537 is not required) may be adopted for the heater 800 illustrated in FIG. 6A. As described in Embodiment 2, in the case of using the heater 800, the heating distribution of the entire heater may be changed according to the size of the sheet P. Accordingly, in conformity with a small-sized sheet, the safety circuit 850 is required not to operate while the difference between the output Iav2 and the output Iav1 is taken during causing the heat-generating members 801 to 803 to generate heat. Thus, in the case of using the heater 800, the value of IPmax1 is set to a value inoperable based on the difference between the output Iav2 and the output Iav1, which may occur during the fixing process for the small-sized sheet. The value of IPmax1 set while the image forming apparatus stops the printing operation is set lower than a value set during the fixing process for the small-sized sheet.

While the present invention has been described with reference to exemplary embodiments, it is to be understood that the invention is not to the disclosed exemplary embodiments. The scope of the following claims is to be accorded the broadest interpretation so as to encompass all such modifications and equivalent structures and functions.

This application claims the benefit or Japanese Patent Application No. 2014-046512, filed Mar. 10, 2014 and Japanese Patent Application No. 2015-025599, filed Feb. 12, 2015 which are incorporated by reference herein in their entirety.

What is claimed is:

1. An image forming apparatus, comprising:
   a fixing unit adapted to fix a toner image formed on a recording material onto the recording material, the fixing unit including a heater including a substrate, and a first heat generating member and a second heat-generating member that are provided on the substrate, and heating the toner image;
   a first driving element provided on power supply path to the first heat-generating member;
   a second driving element provided on a power supply path to the second heat-generating member;
   a control unit controlling the first driving element and the second driving element respectively;
   a first detection unit configured to detect current flowing through the first heat-generating member;
   a second detection unit configured to detect current flowing through the second heat-generating member; and
   a safety circuit receiving output the first detection unit and a second output of the second detection unit, safety circuit outputting a cut-off signal for stopping supplying power to at least one of the first heat-generating member and the second heat-generating member when the difference between a value according to the first output and a value according to the second output exceeds a predetermined threshold.

2. An image forming apparatus according to claim 1, wherein the value according to the first output is an average value of a square of the first output in a predetermined time period longer than half a cycle of an AC wave form flowing in the first and second heat-generating members, and the value according to the second output is an average value of a square of the second output in the predetermined time period.

3. An image forming apparatus according to claim 2, wherein the average value of the square of the first output and the average value of the square of the second output are moving average values.

4. An image forming apparatus according to claim 3, wherein each moving average value is an average value of an output from an integral calculation unit operating independent of a zero-crossing signal of the AC wave form.

5. An image forming apparatus according to claim 1, wherein the fixing unit includes a rotary member configured to convey a recording material, and wherein the threshold is set according to a rotation state of the rotary member.

6. An image forming apparatus according to claim 5, wherein the threshold during the rotary member being stopped is lower than the threshold during rotation.

7. An image forming apparatus according to claim 1, wherein the fixing unit includes a pair of rotary members configured to form a fixing nip configured to thermally fix the toner image on the recording material, and the threshold is set according to the pressure applied to the fixing nip.

8. An image forming apparatus according to claim 7, wherein the threshold during the release of pressure to be applied to the fixing nip is lower than the threshold during the application of the pressure.

9. An image forming apparatus according to claim 1, wherein the threshold is set according to a temperature of the heater.

10. An image forming apparatus according to claim 8, wherein the threshold for the temperature of the heater not performing a fixing process is lower than the threshold for the temperature of the heater during a fixing process.

11. An image forming apparatus according to claim 1, wherein the fixing unit includes a pair of rotary members configured to form a fixing nip for thermally fixing the toner image on the recording material, and
wherein the threshold is set to decrease, in a case of at least one of a case where the rotary members are stopped, a case where a pressure to be applied to the fixing nip is released, and a case where a temperature of the heater is around a normal temperature.

12. An image forming apparatus according to claim 1, wherein the safety circuit outputs the cut-off signal even when a sum of the value according to the first output and the value according to the second output exceeds a predetermined second threshold.

13. An image forming apparatus according to claim 1, wherein the apparatus further comprises a relay configured to stop supplying power to the heater, and the relay is turned off when the cut-off signal is output.

14. An image forming apparatus according to claim 1, wherein with respect to a conveyance direction of the recording material, at least one first heat-generating member is provided for each of an upstream side and a downstream side of the second heat-generating member,
wherein with respect to the direction orthogonal to the conveyance direction, the first heat-generating members have a resultant heat distribution where a heat amount in a first area including a conveyance reference of the recording material is higher than a heat amount in a second area that is farther apart from the conveyance reference than the first area, and
wherein in the first area, the heat amount in the second heat-generating member is lower than a resultant heat amount in the first heat-generating members.

15. An image forming apparatus according to claim 14, wherein when a value acquired by subtracting the value according to the first output from the value according to the second output exceeds the threshold, the safety circuit outputs the cut-off signal, and
wherein when the value according to the first output is greater than the value according to the second output, the safety circuit does not output the cut-off signal.

16. An image forming apparatus according to claim 1, wherein the fixing unit includes a cylindrical film whose inner surface rotates in contact with the heater.

17. A safety circuit mounted on an image forming apparatus comprising a first heat-generating member and a second heat-generating member configured to thermally fix a toner image formed on a recording material onto the recording material, the circuit comprising:
a first input unit configured to receive a first output of a first detection unit configured to detect current flowing through the first heat-generating member;
a second input unit configured to receive a second output of a second detection unit configured to detect current flowing through the second heat-generating member; and
an output unit configured to output a cut-off signal for stopping supplying power to at least one of the first heat-generating member and the second heat-generating member when the difference between a value according to the first output and a value according to the second output exceeds a predetermined threshold.

18. A safety circuit according to claim 17, wherein the value according to the first output is an average value of a square of the first output in a predetermined time period longer than half a cycle of an AC wave form flowing in the first and second heat-generating members, and the value according to the second output is an average value of a square of the second output in the predetermined time period.

19. A safety circuit according to claim 18, wherein the average value of the square of the first output and the average value of the square of the second output are moving average values.

20. A safety circuit according to claim 19, wherein each moving average value is an average value of an output from an integral calculation unit operating independent of a zero-crossing signal of the AC wave form.

21. A safety circuit according to claim 17, wherein the fixing unit includes a rotary member configured to convey a recording material, and wherein the threshold is set according to a rotation state of the rotary member.

22. A safety circuit according to claim 21, wherein the threshold during the rotary member being stopped is lower than the threshold during rotation.

23. A safety circuit according to claim 17, wherein the fixing unit includes a pair of rotary members configured to form a fixing nip configured to thermally fix the toner image on the recording material, and the threshold is set according to a pressure applied to the fixing nip.

24. A safety circuit according to claim 23, wherein the threshold during the release of pressure to be applied to the fixing nip is lower than the threshold during the application of the pressure.

25. A safety circuit according to claim 17, wherein the threshold is set according to a temperature of the heater.

26. A safety circuit according to claim 25,
wherein the threshold for the temperature of the heater not performing a fixing process is lower than the threshold for the temperature of the heater during a fixing process.

27. A safety circuit according to claim 17, wherein the fixing unit includes a pair of rotary members configured to form a fixing nip for thermally fixing the toner image on the recording material, and
wherein the threshold is set to decrease, in a case of at least one of a case where the rotary members are stopped, a case where a pressure to be applied to the fixing nip is released, and a case where a temperature of the heater is around a normal temperature.

28. A safety circuit according to claim 17,
wherein the safety circuit outputs the cut-off signal even when a sum of the value according to the first output and the value according to the second output exceeds a predetermined second threshold.

29. A safety circuit according to claim 17,
wherein when a value acquired by subtracting the value according to the first output from the value according to the second output exceeds the threshold, the safety circuit outputs the cut-off signal, and
wherein when the value according to the first output is greater than the value according to the second output, the safety circuit does not output the cut-off signal.

30. A safety circuit according to claim 17,
wherein the safety circuit is a semiconductor integrated circuit.

31. An image forming apparatus, comprising:
a fixing unit configured to fix a toner image formed on recording material onto the recording material, the fixing unit including a heater including a substrate, and a first heat generating member and a second heat-generating member that are provided on the substrate, and heating the toner image;
a first driving element provided on a power supply path to the first heat-generating member;
a second driving element provided on a power supply path to the second heat-generating member;
a control unit controlling the first driving element and the second driving element respectively;
a first detection unit configured to detect current flowing through the first heat-generating member;
a second detection unit configured to detect current flowing through the second heat-generating member; and
a safety circuit receiving a first output of the first detection unit and a second output of the second detection unit, the safety circuit outputting a cut-off signal for stopping supplying power to at least one of the first heat-generating member and the second heat-generating member when a value acquired by dividing the value according to the second output by the value according to the first output exceeds a predetermined threshold.

32. An image forming apparatus according to claim 31,
wherein the value according to the first output is an average value of a square of the first output in a predetermined time period longer than half a cycle of an AC wave form flowing in the first and second heat-generating members, and the value according to the second output is an average value of square of the second output in the predetermined time period.

33. An image forming apparatus according to claim 32,
wherein the average value of the square of the first output and the average value of the square of the second output are moving average values.

34. An image forming apparatus according to claim 31,
wherein the safety circuit outputs the cut-off signal even, when a sum of the value according to the first output and the value according to the second output exceeds a predetermined second threshold.

35. An image forming apparatus according to claim 31,
wherein the apparatus further comprises a relay configured to stop supplying power to the heater, and the relay is turned off when the cut-off signal is output.

36. An image forming apparatus according to claim 31,
wherein the first heat-generating member is provided only for a first area including a conveyance reference of the recording material, and the second heat-generating member is provided only for a second area that is farther apart from the conveyance reference than the first area.

37. An image forming apparatus according to claim 31,
wherein the fixing unit includes a cylindrical film whose inner surface rotates in contact with the heater.

38. A safety circuit mounted on an image forming apparatus comprising a first heat-generating member and a second heat-generating member configured to thermally fix a toner image formed on a recording material onto the recording material, the circuit comprising:
a first input unit configured to receive a first output of a first detection unit configured to detect current flowing through the first heat-generating member;
a second input unit configured to receive a second output of a second detection unit configured to detect current flowing through the second heat- generating member; and
an output unit configured to output a cut-off signal for stopping supplying power to at least one of the first heat-generating member and the second heat-generating member when a value acquired by dividing the value according to the second output by the value according to the first output exceeds a predetermined threshold.

39. A safety circuit according to claim 38,
wherein the value according to the first output is an average value of a square of the first output in a predetermined time period longer than half a cycle of an AC wave form flowing in the first and second heat-generating members, and the value according to the second output is an average value of a square of the second output in the predetermined time period.

40. A safety circuit according to claim 39,
wherein the average value of the square of the first output and the average value of the square of the second output are moving average values.

41. A safety circuit according to claim 38,
wherein the safety circuit outputs the cut-off signal even when a sum of the value according to the first output and the value according to the second output exceeds a predetermined second threshold.

42. A safety circuit according to claim 38,
wherein the safety circuit is a semiconductor integrated circuit.

* * * * *